United States Patent
Hirata

(10) Patent No.: US 12,496,907 B2
(45) Date of Patent: Dec. 16, 2025

(54) FAILURE SIGN DETERMINATION DEVICE, ONBOARD DEVICE, AND FAILURE SIGN DETERMINATION METHOD

(71) Applicant: Mitsubishi Electric Corporation, Tokyo (JP)

(72) Inventor: Toru Hirata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 524 days.

(21) Appl. No.: 17/924,493

(22) PCT Filed: Jun. 19, 2020

(86) PCT No.: PCT/JP2020/024200
§ 371 (c)(1),
(2) Date: Nov. 10, 2022

(87) PCT Pub. No.: WO2021/255927
PCT Pub. Date: Dec. 23, 2021

(65) Prior Publication Data
US 2023/0173922 A1    Jun. 8, 2023

(51) Int. Cl.
*G01M 13/04*       (2019.01)
*B60L 3/00*        (2019.01)
(Continued)

(52) U.S. Cl.
CPC ............ *B60L 3/003* (2013.01); *B61C 3/00* (2013.01); *G01M 13/04* (2013.01); *G01R 23/16* (2013.01); *G07C 5/0808* (2013.01)

(58) Field of Classification Search
None
See application file for complete search history.

(56) References Cited

U.S. PATENT DOCUMENTS

| 7,224,807 | B2* | 5/2007 | Welsh | G05B 5/01 |
| | | | | 702/56 |
| 7,487,679 | B2* | 2/2009 | Sirrine | G01H 1/10 |
| | | | | 73/659 |

(Continued)

FOREIGN PATENT DOCUMENTS

| JP | 2004116571 A | 4/2004 |
| JP | 2007252134 A | 9/2007 |

(Continued)

OTHER PUBLICATIONS

Office Action issued in corresponding India Patent Application No. 202227065207, mailed Mar. 7, 2023, 6 pages.

(Continued)

*Primary Examiner* — Jonathan M Dager
(74) *Attorney, Agent, or Firm* — BUCHANAN, INGERSOLL & ROONEY PC

(57) ABSTRACT

A failure sign determining device includes an acquirer to acquire pieces of sensor data based on respective values measured by multiple sensors, an FFT processor to execute fast Fourier transform on each of the pieces of sensor data and thereby generate a piece of frequency spectrum data, and a determiner to determine the existence of a failure sign on the basis of comparison between the piece of frequency spectrum data and a spectrum range defined for the sensor. The determiner, only when determining that a failure sign exists, transmits at least either of the piece of frequency spectrum data and the piece of sensor data to an analysis apparatus.

12 Claims, 17 Drawing Sheets

(51) Int. Cl.
   *B61C 3/00* (2006.01)
   *G01R 23/16* (2006.01)
   *G07C 5/08* (2006.01)

(56) References Cited

U.S. PATENT DOCUMENTS

| | | | | |
|---|---|---|---|---|
| 7,930,111 | B2* | 4/2011 | Luo | F16C 19/527 |
| | | | | 702/33 |
| 8,442,778 | B2* | 5/2013 | Bechhoefer | F03D 7/047 |
| | | | | 290/44 |
| 8,930,166 | B1 | 1/2015 | Das | G06F 18/2433 |
| | | | | 702/186 |
| 8,991,254 | B2* | 3/2015 | Raguenet | B25B 5/163 |
| | | | | 73/587 |
| 10,643,405 | B2* | 5/2020 | Hale | B64C 27/006 |
| 11,847,531 | B1* | 12/2023 | Ozturk | G06N 20/10 |
| 2003/0088346 | A1* | 5/2003 | Calkins | G01H 1/003 |
| | | | | 73/78 |
| 2006/0167659 | A1* | 7/2006 | Miyasaka | F16C 19/52 |
| | | | | 702/185 |
| 2009/0024268 | A1* | 1/2009 | Eagan | G01M 17/00 |
| | | | | 701/31.4 |
| 2012/0072070 | A1* | 3/2012 | Eagan | G01M 17/00 |
| | | | | 701/31.4 |
| 2013/0013231 | A1* | 1/2013 | Banerjee | B60L 3/0061 |
| | | | | 702/58 |
| 2013/0116937 | A1* | 5/2013 | Calhoun | G06F 17/00 |
| | | | | 702/35 |
| 2016/0033580 | A1* | 2/2016 | Qiao | G01R 31/343 |
| | | | | 324/765.01 |
| 2017/0006401 | A1* | 1/2017 | Kropp | H04S 7/308 |
| 2017/0336430 | A1* | 11/2017 | Winslow | G01P 3/48 |
| 2019/0025813 | A1* | 1/2019 | Cella | H03M 13/353 |
| 2020/0090425 | A1* | 3/2020 | Senft-Grupp | G01R 31/3648 |
| 2020/0130437 | A1* | 4/2020 | Root | G07C 5/0808 |
| 2020/0134939 | A1* | 4/2020 | Schell | G07C 5/008 |
| 2020/0134942 | A1* | 4/2020 | Root | B60C 23/131 |
| 2020/0363296 | A1* | 11/2020 | Westlund | G06N 7/01 |
| 2021/0125428 | A1* | 4/2021 | Tedesco | G07C 5/0808 |
| 2021/0335061 | A1* | 10/2021 | Claessens | G07C 5/0816 |
| 2021/0335062 | A1* | 10/2021 | Claessens | G06N 20/00 |
| 2022/0038913 | A1* | 2/2022 | Sun | H04W 48/08 |
| 2022/0180672 | A1* | 6/2022 | Madrid | F16N 29/04 |
| 2024/0192090 | A1* | 6/2024 | Yi | G01M 13/045 |
| 2024/0192091 | A1* | 6/2024 | Yi | G01M 17/007 |
| 2024/0194000 | A1* | 6/2024 | Conklin | G07C 5/008 |

FOREIGN PATENT DOCUMENTS

| | | |
|---|---|---|
| JP | 2010252443 A | 11/2010 |
| JP | 2010284032 A | 12/2010 |
| JP | 2012008030 A | 1/2012 |
| JP | 2015053767 A | 3/2015 |
| JP | 2016083759 A | 5/2016 |
| WO | 2018225067 A1 | 12/2018 |

OTHER PUBLICATIONS

Office Action issued in corresponding Japan Patent Application No. 2022-531227, mailed Jan. 31, 2023, 14 pages Including 7 pages of English translation.

International Search Report (PCT/ISA/210) with translation and Written Opinion (PCT/ISA/237) mailed on Jul. 14, 2020, by the Japan Patent Office as the International Searching Authority for International Application No. PCT/JP2020/024200. (8 pages).

Notice of Reasons for Refusal dated May 16, 2023, issued in the corresponding Japanese Patent Application No. 2022-531227, 10 pages including 5 pages of English Translation.

* cited by examiner

FIG.4

| ADDRESS | UPPER LIMIT OF SPECTRUM RANGE |
|---|---|
| 0000h | Th1 |
| 0001h | Th1 |
| 0002h | Th1 |
| 0010h | Th2 |
| ⋮ | ⋮ |

FIG.10

| ADDRESS | UPPER LIMIT OF VARIED SPECTRUM RANGE |
|---|---|
| 0000h | Th1 |
| 0014h | Th2 |
| 0044h | Th3 |
| 020Ch | Th5 |
| ⋮ | ⋮ |

FAILURE SIGN DETERMINATION DEVICE, ONBOARD DEVICE, AND FAILURE SIGN DETERMINATION METHOD

TECHNICAL FIELD

The present disclosure relates to a failure sign determining device, an in-vehicle apparatus, and a method of determining a failure sign.

BACKGROUND ART

A typical example of in-vehicle apparatuses, which are apparatuses installed in vehicles, is an electric vehicle control device to convert electric power fed from an overhead wire and feed the converted electric power to a motor. In order to improve the safety of such an electric vehicle control device, the existence of a failure in a component, such as capacitor, resistor element, or reactor, of the electric vehicle control device is required to be accurately detected. For example, in the case of occurrence of a short-circuit fault in the capacitor, the failure can be detected because of an excessively high value measured by a current sensor. The value measured by the current sensor, however, cannot contribute to detection of a failure sign, such as a decrease in the capacity of the capacitor. The electric vehicle control device disclosed in Patent Literature 1 differentiates the current signal generated by a current sensor and executes fast Fourier transform on the signal resulting from the differentiation, and thereby obtains a frequency component of the signal resulting from the differentiation of the current signal. When the peak value of the amplitude level of the calculated frequency component exceeds a threshold, the electric vehicle control device deems that a decrease occurs in the capacity of the capacitor.

CITATION LIST

Patent Literature

Patent Literature 1: Unexamined Japanese Patent Application Publication No. 2010-252443

SUMMARY OF INVENTION

Technical Problem

The frequency analysis based on the data obtained through fast Fourier transform on values measured by a sensor can achieve detection of a failure sign, which cannot be directly detected from the values measured by the sensor. Unfortunately, the frequency analysis involves sampling of values measured by the sensor at a sampling frequency of several hundreds of kilohertz to several megahertz, resulting in generation of a large volume of data from the values measured by the sensor. The frequency analysis preferably refers to values measured by multiple sensors for more accurate determination of the existence of a failure sign, but an increase in the number of sensors further expands the volume of data generated for the frequency analysis.

In the case where more detailed frequency analysis is executed by an analysis apparatus installed in the vehicle or outside the vehicle, the control device executes fast Fourier transform and transmits the large volume of data to the analysis apparatus, so that a network in the vehicle suffers from increased communication loads.

An objective of the present disclosure, which has been accomplished in view of the above situations, is to improve the accuracy of determination of the existence of a failure sign while suppressing an increase in communication loads.

Solution to Problem

In order to achieve the above objective, a failure sign determining device according to an aspect of the present disclosure determines existence of a failure sign in a component of an apparatus installed in a vehicle. The failure sign determining device includes an acquirer, an FFT processor, and a determiner. The acquirer acquires pieces of sensor data on multiple sensors installed in the vehicle for measuring mutually different physical quantities. The pieces of sensor data are pieces of digital data based on respective values measured by the sensors. The FFT processor executes fast Fourier transform on each of the pieces of sensor data acquired by the acquirer and thereby generates a piece of frequency spectrum data indicating a spectrum intensity at each frequency. The determiner determines the existence of a failure sign on the basis of comparison between the piece of frequency spectrum data and a spectrum range defined for the sensor corresponding to the piece of sensor data used in the generation of the piece of frequency spectrum data. The determiner, only when determining that a failure sign exists, transmits at least either of the piece of frequency spectrum data applied to the determination of the existence of a failure sign and the piece of sensor data used in the generation of the piece of frequency spectrum data applied to the determination of the existence of a failure sign to an analysis apparatus installed in the vehicle or outside the vehicle.

Advantageous Effects of Invention

The failure sign determining device according to an aspect of the present disclosure determines the existence of a failure sign on the basis of the pieces of frequency spectrum data generated from the sensor data based on the respective values measured by the sensors. In addition, the failure sign determining device, only when determining that a failure sign exists, transmits at least either of the piece of frequency spectrum data and the piece of sensor data to the analysis apparatus. This configuration can improve the accuracy of determination of the existence of a failure sign while suppressing an increase in communication loads.

BRIEF DESCRIPTION OF DRAWINGS

FIG. 4 illustrates exemplary spectrum ranges according to Embodiment 1;

FIG. 10 illustrates exemplary spectrum ranges according to Embodiment 2;

DESCRIPTION OF EMBODIMENTS

Figure 1:
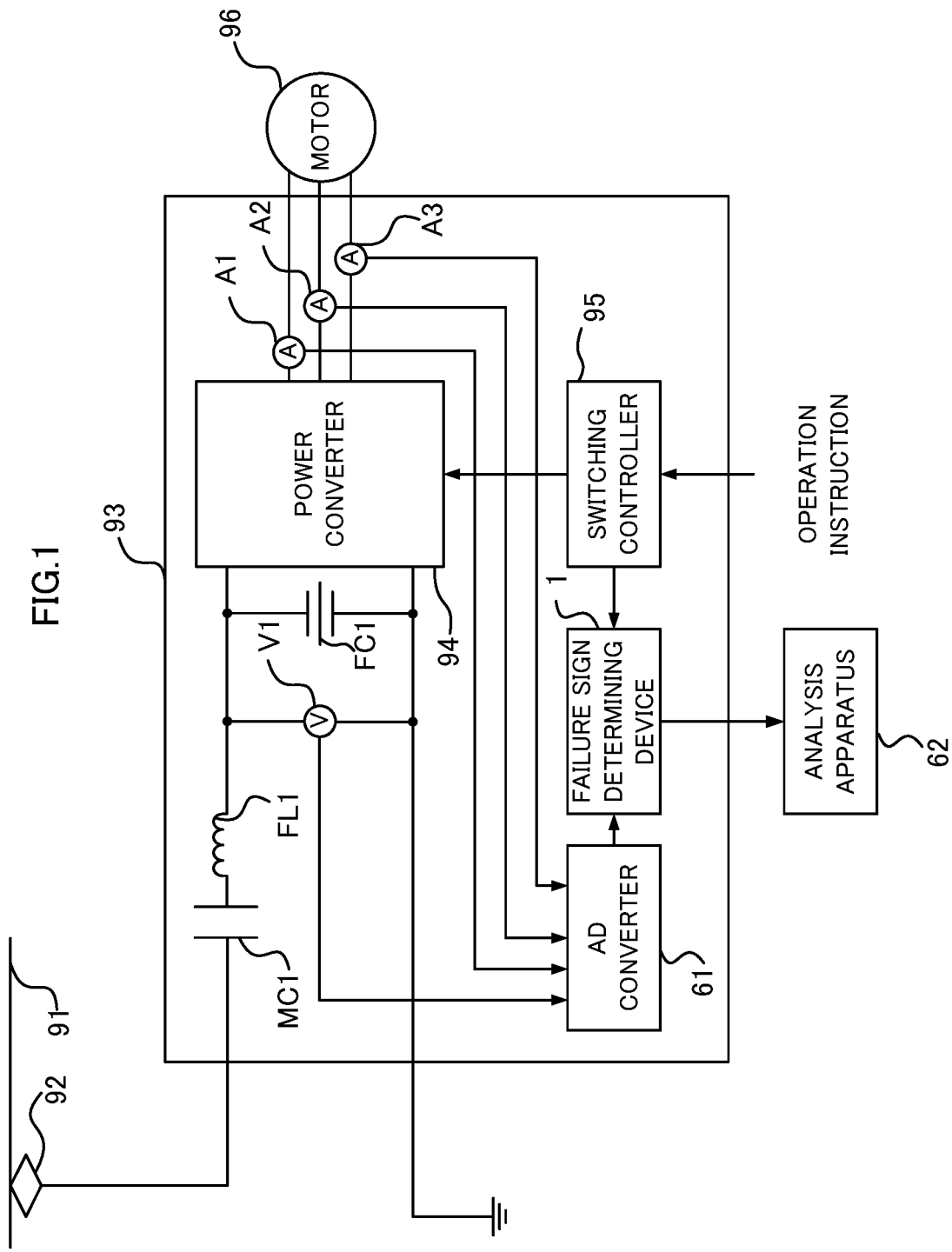
FIG. 1 is a block diagram illustrating a configuration of a power conversion apparatus according to Embodiment 1.

A failure sign determining device, an in-vehicle apparatus, and a method of determining a failure sign according to some embodiments are described in detail below with reference to the accompanying drawings. In the drawings, the components identical or corresponding to each other are provided with the same reference symbol.

Embodiment 1

The description of Embodiment 1 is directed to a failure sign determining device 1 to determine the existence of a failure sign in a component of an apparatus installed in a vehicle. The failure sign in the component of the apparatus indicates a variation in properties of the component of the apparatus that appears in advance of occurrence of a failure in the component of the apparatus.

The description of Embodiment 1 is directed to determination of the existence of a failure sign executed by the failure sign determining device 1, focusing on an example in which the apparatus installed in the vehicle is a power conversion apparatus 93 installed in an electric railway vehicle illustrated in FIG. 1. The failure sign determining device 1 determines the existence of a failure sign in a component of the power conversion apparatus 93, specifically, a variation in the electrical properties of the component.

As illustrated in FIG. 1, a current collector 92 acquires electric power from a substation via an overhead wire 91 and feeds the electric power to the power conversion apparatus 93. The current collector 92 corresponds to a power source of the power conversion apparatus 93. A typical example of the current collector 92 is a pantograph. The power conversion apparatus 93 converts DC power fed from the current collector 92 into three-phase AC power and feeds the three-phase AC power to a motor 96. The motor 96, when receiving electric power from the power conversion apparatus 93, generates a force to drive the electric railway vehicle. The motor 96 is a three-phase induction motor, for example.

The power conversion apparatus 93 includes a power converter 94 to convert electric power fed from the current collector 92 into electric power to be fed to the motor 96, a contactor MC1 to electrically connect the power converter 94 to the current collector 92 or electrically disconnect the power converter 94 from the current collector 92, a filter capacitor FC1 connected between the primary terminals of the power converter 94, a filter reactor FL1 to configure a filter to attenuate harmonic components together with the filter capacitor FC1, and a switching controller 95 to control switching elements included in the power converter 94.

In order to determine the existence of a failure sign in the above-mentioned component, the power conversion apparatus 93 includes the failure sign determining device 1. The failure sign determining device 1 determines the existence of a failure sign, on the basis of pieces of frequency spectrum data generated from the sensor data based on the respective values measured by multiple sensors for measuring mutually different physical quantities. The physical quantities each indicate a variable of the physical formula representing the electrical properties of a component of the apparatus, or a variable of the physical formula representing a movement of the vehicle, for example. Specifically, the physical quantities each indicate a voltage, current, acceleration, or amount of vibration, for example.

As the multiple sensors, the power conversion apparatus 93 includes electrical sensors to measure electrical physical quantities. In detail, the power conversion apparatus 93 includes a first voltage sensor V1 provided in parallel to the filter capacitor FC1, and first current sensors A1, A2, and A3 provided to the respective lines connecting the U-phase, V-phase, and W-phase terminals of the power converter 94 to the motor 96. The power conversion apparatus 93 further includes an AD converter 61 to generate pieces of sensor data on the individual sensors through analog to digital (AD) conversion of the respective values measured by the first voltage sensor V1 and the first current sensors A1, A2, and A3 into pieces of digital data, and outputs the pieces of generated sensor data to the failure sign determining device 1.

The individual components of the power conversion apparatus 93 are described in detail below.

The power converter 94 includes switching elements, such as insulated gate bipolar transistors (IGBTs). The switching elements are controlled by the switching controller 95, so that the power converter 94 converts DC power fed from the current collector 92 via the filter capacitor FC1 into three-phase AC power and feeds the three-phase AC power to the motor 96.

The contactor MC1 is a DC electromagnetic contactor. The contactor MC1 has one end connected to the current collector 92, and the other end connected to one end of the filter reactor FL1. The contactor MC1 is controlled by a contactor controller, which is not illustrated. When the contactor controller closes the contactor MC1, the one and the other ends of the contactor MC1 are connected to each other and cause the filter reactor FL1 to be electrically connected to the current collector 92. The power converter 94 and the filter capacitor FC1 are thus electrically connected to the current collector 92 and can receive electric power from the current collector 92. In contrast, when the contactor controller opens the contactor MC1, the one and the other ends of the contactor MC1 are insulated from each other and cause the filter reactor FL1 to be insulated from the current collector 92. The power converter 94 and the filter capacitor FC1 are thus electrically disconnected from the current collector 92 and can receive no electric power from the current collector 92.

The filter capacitor FC1 is connected between the primary terminals of the power converter 94 and charged with electric power fed from the current collector 92.

The one end of the filter reactor FL1 is connected to the other end of the contactor MC1, and the other end of the filter reactor FL1 is connected to one of the primary terminals of the power converter 94 and one end of the filter capacitor FC1.

The filter capacitor FC1 and the filter reactor FL1 configure an LC filter, which attenuates the harmonic components generated by switching operations of the switching elements of the power converter 94, and thus prevents the harmonic components from reaching the overhead wire 91.

The switching controller 95 controls the switching elements included in the power converter 94 in accordance with operation instructions provided from a cab, which is not illustrated. The operation instructions include a power running instruction indicating an acceleration of the electric railway vehicle and a braking instruction indicating a deceleration of the electric railway vehicle, for example. The power running instruction and the braking instruction are each a notch instruction, for example. The switching controller 95 also identifies the operation mode in accordance with the operation instruction and the speed of the electric railway vehicle acquired from a speed sensor, which is not illustrated, and executes a pulse width modulation (PWM) control in accordance with the operation mode. In Embodiment 1, the switching controller 95 executes the PWM control over the switching elements of the power converter 94 in accordance with the operation mode.

In detail, the switching controller 95 identifies the operation mode, specifically, the operating frequency of the power converter 94 and the modulation factor and the carrier wave frequency of the switching control signal for controlling the switching elements of the power converter 94, in accordance with the operation instruction and the speed of the electric railway vehicle. The switching controller 95 also acquires the respective values measured by the first voltage sensor V1 and the first current sensors A1, A2, and A3, which are described below. The switching controller 95 then executes the PWM control over the switching elements of the power converter 94 such that the power output from the power converter 94 approaches the target value, on the basis of the operating frequency of the power converter 94 and the modulation factor and the carrier wave frequency of the switching control signal, in view of the respective values measured by the first voltage sensor V1 and the first current sensors A1, A2, and A3.

The first voltage sensor V1 measures a value of voltage input to the power converter 94, that is, a value of voltage between the terminals of the filter capacitor FC1.

The first current sensors A1, A2, and A3 measure values of current output from the power converter 94. In detail, the first current sensor A1 is provided to the line connecting the U-phase terminal of the power converter 94 to the motor 96 and measures a value of U-phase current output from the power converter 94. The first current sensor A2 is provided to the line connecting the V-phase terminal of the power converter 94 to the motor 96 and measures a value of V-phase current output from the power converter 94. The first current sensor A3 is provided to the line connecting the W-phase terminal of the power converter 94 to the motor 96 and measures a value of W-phase current output from the power converter 94.

The failure sign determining device 1 determines the existence of a failure sign in the above-mentioned component of the power conversion apparatus 93. The failure sign determining device 1 executes fast Fourier transform (FFT) on a piece of sensor data based on each of the values measured by the first voltage sensor V1 and the first current sensors A1, A2, and A3 and thereby generates a piece of frequency spectrum data, and then determines the existence of a failure sign on the basis of the frequency spectrum data, as is described in detail below. Then, the failure sign determining device 1, only when determining that a failure sign exists, transmits at least either of the frequency spectrum data applied to the determination of the existence of a failure sign and the sensor data corresponding to the frequency spectrum data to an analysis apparatus 62 installed in the vehicle or outside the vehicle. The analysis apparatus 62 is provided in aboveground equipment or the cab of the vehicle, for example. The analysis apparatus 62 executes more detailed analysis on the failure sign than that in the failure sign determining device 1, on the basis of information, such as a history of frequency spectrum data or sensor data.

The existence of a failure sign is determined on the basis of pieces of frequency spectrum data generated from the sensor data based on the respective values measured by multiple sensors for measuring mutually different physical quantities, specifically, the first voltage sensor V1 and the first current sensors A1, A2, and A3. This configuration can improve the accuracy of determination of the existence of a failure sign. In addition, at least either of the frequency spectrum data and the sensor data is transmitted to the analysis apparatus 62 only when a failure sign is determined to exist. This configuration can suppress an increase in communication loads.

Figure 2:
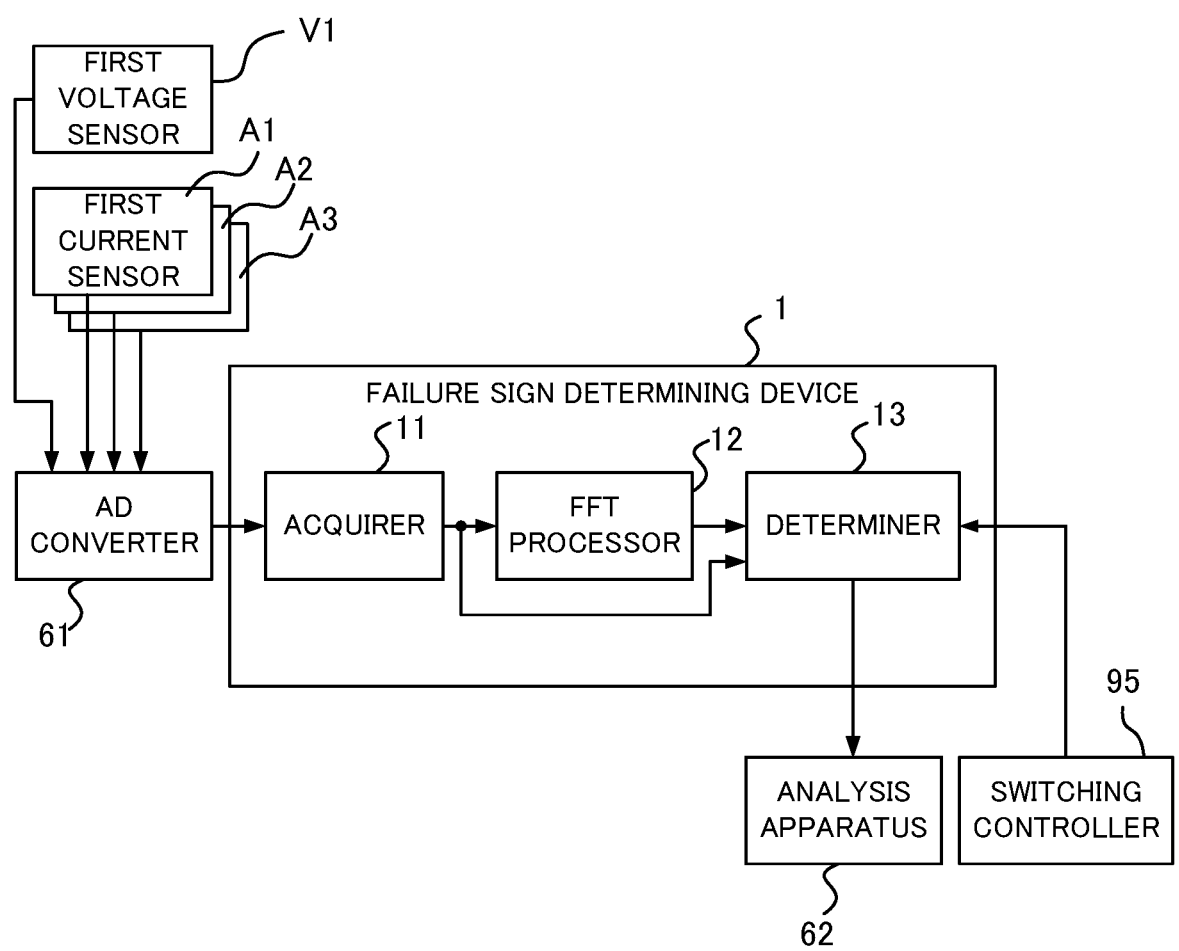
FIG. 2 is a block diagram illustrating a configuration of a failure sign determining device according to Embodiment 1.

As illustrated in FIG. 2, the failure sign determining device 1 includes an acquirer 11 to acquire pieces of sensor data, an FFT processor 12 to execute FFT on a piece of sensor data and thereby generate a piece of frequency spectrum data, and a determiner 13 to determine the existence of a failure sign on the basis of comparison between the frequency spectrum data and the spectrum range defined for the sensor corresponding to the sensor data used in the generation of the frequency spectrum data.

The components of the failure sign determining device 1 are described in detail below.

The acquirer 11 acquires, from the AD converter 61, pieces of sensor data on the respective sensors, specifically, a piece of sensor data based on the value measured by the first voltage sensor V1, a piece of sensor data based on the value measured by the first current sensor A1, a piece of sensor data based on the value measured by the first current sensor A2, and a piece of sensor data based on the value measured by the first current sensor A3. The acquirer 11 then selects any of the acquired pieces of sensor data and then provides the selected piece of sensor data to the FFT processor 12 and the determiner 13.

The FFT processor 12 executes FFT on the piece of sensor data acquired from the acquirer and thereby generates a piece of frequency spectrum data indicating a spectrum intensity at each frequency. The FFT processor 12 then outputs the generated frequency spectrum data to the determiner 13.

The determiner 13 determines the existence of a failure sign on the basis of comparison between the frequency spectrum data and the spectrum range defined for the sensor corresponding to the sensor data used in the generation of the frequency spectrum data. When the frequency spectrum data exceeds a spectrum range, a failure sign can be deemed to exist, as is described in detail below. The spectrum range is preferably defined on the basis of simulations. The determiner 13, only when determining that a failure sign exists, transmits at least either of the frequency spectrum data applied to the determination of the existence of a failure sign and the sensor data used in the generation of the frequency spectrum data applied to the determination of the existence of a failure sign, to the analysis apparatus 62.

The determiner 13 preferably acquires information on the operation mode from the switching controller 95, and determines the existence of a failure sign when the operation mode accords with a predetermined operation mode. In detail, the determiner 13 preferably determines the existence of a failure sign, when the operation mode, specifically, the operating frequency of the power converter 94, the modulation factor, and the carrier wave frequency accord with a predetermined operating frequency, a predetermined modulation factor, and a predetermined carrier wave frequency, respectively.

An exemplary manner of implementation of the failure sign determining device 1 is described below with reference to FIG. 3. The acquirer 11, the FFT processor 12, and a part of the determiner 13 are implemented on a field programmable gate array (FPGA) 51.

The acquirer 11 includes a reception circuit 21 to acquire pieces of sensor data on the respective sensors from the AD converter 61, and a selector 22 to select any of the pieces of sensor data on the respective sensors received by the reception circuit 21.

The reception circuit 21 is an input/output (I/O) module pursuant to any interface standard for data acquisition from the AD converter 61.

The selector 22 selects one of the multiple pieces of sensor data acquired by the reception circuit 21 in the order of acquisition, for example, and then outputs the selected piece of sensor data to the FFT processor 12 and the determiner 13.

The FFT processor 12 includes an FFT circuit 31 to execute FFT on a piece of sensor data and thereby generate a piece of frequency spectrum data, and an FFT controller 32 to control the FFT circuit 31.

The FFT circuit 31 executes FFT on a piece of sensor data acquired from the selector 22 and thereby generates a piece of frequency spectrum data, and then outputs the frequency spectrum data to a spectrum data storage 44 and a comparator 47 included in the determiner 13, which are described below. The FFT controller 32 executes controls of the FFT circuit 31, such as an instruction to initiate or stop the FFT at the FFT circuit 31 or restriction of the number of repetitions of the FFT.

The determiner 13 includes a central processing unit (CPU) 41 to determine the existence of a failure sign, a memory 42 to store programs to be executed by the CPU 41, and a communication interface (IF) 43 to achieve communication with the analysis apparatus 62 and the switching controller 95. The determiner 13 further includes the spectrum data storage 44 to store the piece of frequency spectrum data generated by the FFT circuit 31, a sensor data storage 45 to store the piece of sensor data selected by the selector 22, a spectrum range storage 46 to store spectrum ranges defined for the respective sensors, the comparator 47 to compare the frequency spectrum data with the spectrum range, and a counter 48 to accumulate results output from the comparator 47.

The spectrum data storage 44, the sensor data storage 45, the spectrum range storage 46, the comparator 47, and the counter 48 are implemented on the FPGA 51. The CPU 41, the memory 42, the communication IF 43, the spectrum data storage 44, the sensor data storage 45, the spectrum range storage 46, and the counter 48 are connected to each other via system buses B1. The selector 22 of the acquirer 11 and the FFT controller 32 of the FFT processor 12 are also connected to the system buses B1.

The CPU 41 determines the existence of a failure sign in accordance with the programs stored in the memory 42. The CPU 41, only when determining that a failure sign exists, transmits at least either of the frequency spectrum data stored in the spectrum data storage 44 and the sensor data stored in the sensor data storage 45 to the analysis apparatus 62.

The communication IF 43 is a communication module pursuant to any communication standard for achieving communication with the analysis apparatus 62 and the switching controller 95.

The spectrum data storage 44 stores the piece of frequency spectrum data generated by the FFT circuit 31. The spectrum data storage 44 is a dual-port memory, which can be simultaneously accessed by both of the FFT circuit 31 and the CPU 41.

The sensor data storage 45 stores the piece of sensor data selected by the selector 22. The sensor data storage 45 is a dual-port memory, which can be simultaneously accessed by both of the selector 22 and the CPU 41.

The spectrum range storage 46 retains spectrum ranges defined for the respective sensors. In detail, the spectrum range storage 46 retains a spectrum range for the first voltage sensor V1, a spectrum range for the first current sensor A1, a spectrum range for the first current sensor A2, and a spectrum range for the first current sensor A3. Specifically, as illustrated in FIG. 4, the spectrum range storage 46 stores addresses corresponding to frequencies and the upper limits of spectrum ranges at the respective frequencies, for each sensor. The spectrum range storage 46 is a dual-port memory, which can be simultaneously accessed by both of the comparator 47 and the CPU 41.

Figure 3:
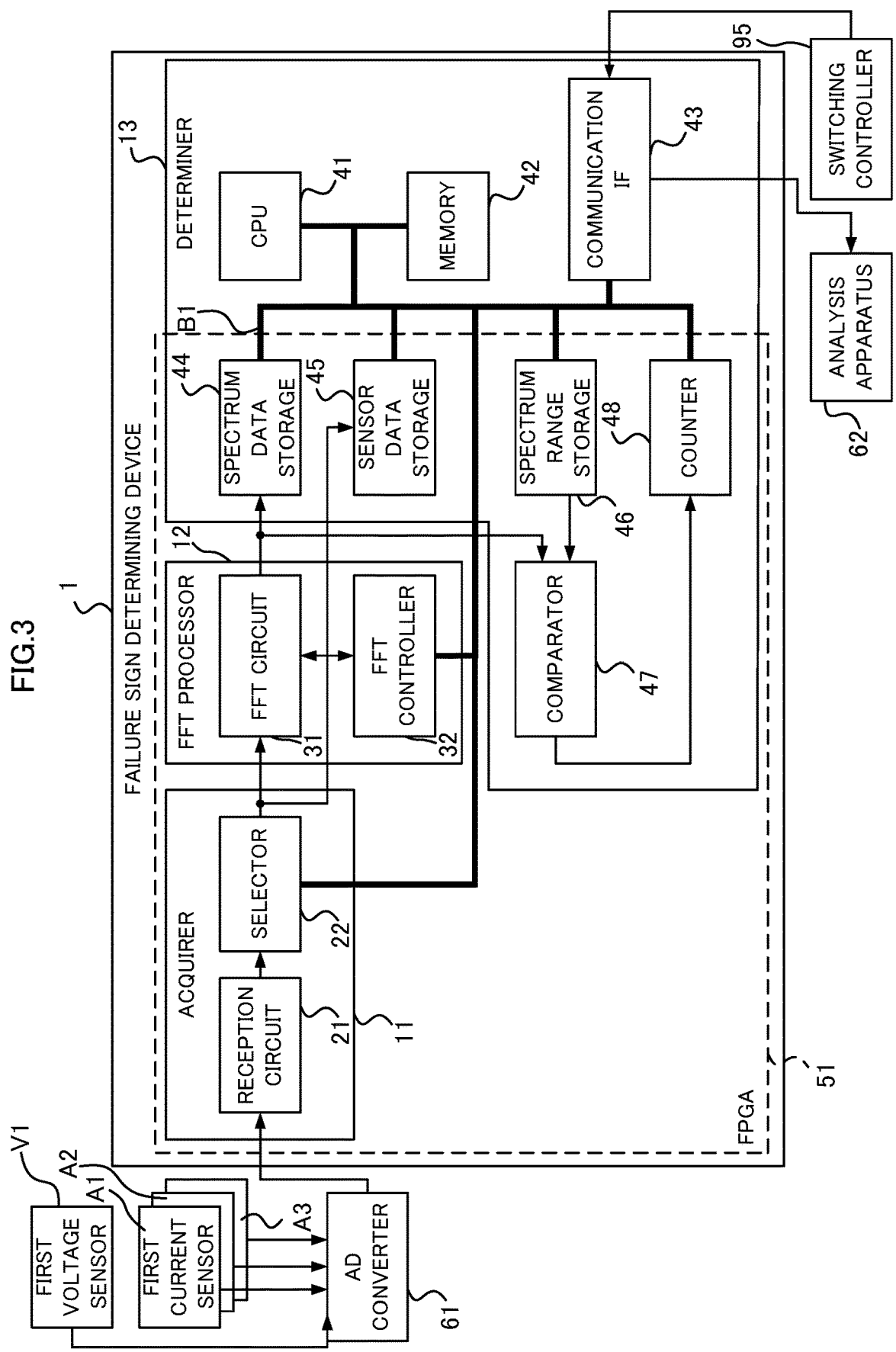
FIG. 3 illustrates an exemplary manner of implementation of the failure sign determining device according to Embodiment 1.

The comparator 47 illustrated in FIG. 3 reads a spectrum range from the spectrum range storage 46, and then compares the piece of frequency spectrum data generated by the FFT circuit 31 with the spectrum range. In detail, the comparator 47 determines whether the spectrum intensity indicated by the piece of frequency spectrum data is within the spectrum range for each frequency. Specifically, as illustrated in FIG. 4, the comparator 47 compares the spectrum intensity indicated by the first piece of frequency spectrum data with the upper limit Th1 of the spectrum range defined for the address 0000h. In this case, the spectrum range has the lower limit of 0 and the upper limit of Th1. When the spectrum intensity indicated by the frequency spectrum data is higher than the upper limit Th1 of the spectrum range, in other words, the spectrum intensity indicated by the frequency spectrum data is not within the spectrum range, then the comparator 47 outputs a value of 1. In contrast, when the spectrum intensity indicated by the frequency spectrum data is equal to or lower than the upper limit Th1 of the spectrum range, in other words, the spectrum intensity indicated by the frequency spectrum data is within the spectrum range, then the comparator 47 outputs a value of 0.

Figure 5:
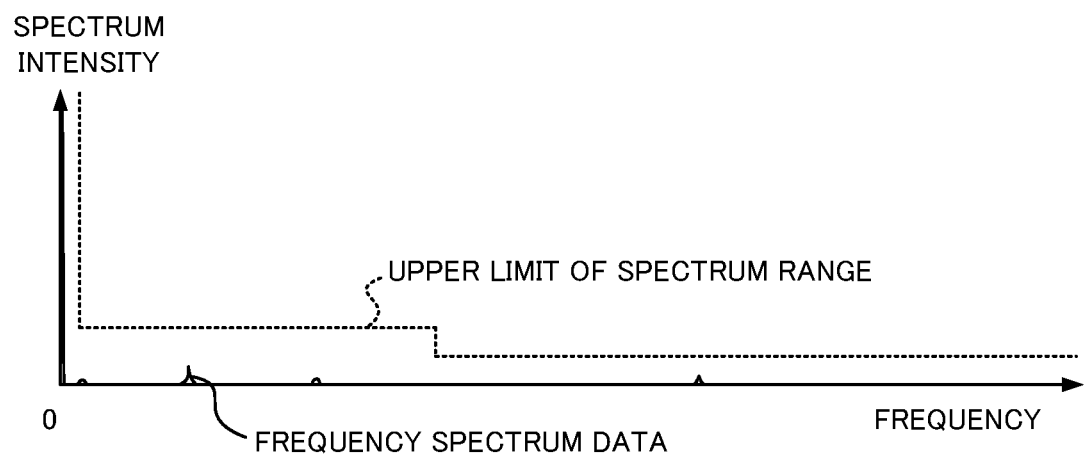
FIG. 5 illustrates an example of frequency spectrum data in the case of no failure sign in the power conversion apparatus according to Embodiment 1.
Figure 6:
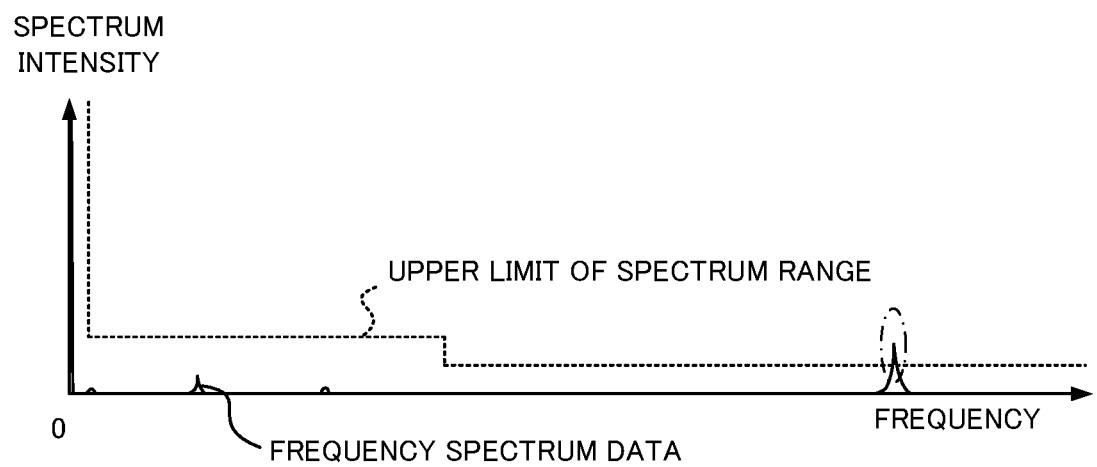
FIG. 6 illustrates an example of frequency spectrum data in the case of any failure sign in the power conversion apparatus according to Embodiment 1.

FIGS. 5 and 6 each illustrate an example of the frequency spectrum data and the spectrum range. In FIGS. 5 and 6, the horizontal axis indicates the frequency, and the vertical axis indicates the spectrum intensity. In FIGS. 5 and 6, the solid line represents a piece of frequency spectrum data generated from the sensor data based on the value measured by the first voltage sensor V1, and the dotted line represents the upper limit of the spectrum range defined for the first voltage sensor V1. In Embodiment 1, the spectrum range varies stepwise. The upper limit of the spectrum range at frequencies in the vicinity of 0 Hz is defined to be a sufficiently large value. The frequencies in the vicinity of 0 Hz indicate a sufficiently narrow frequency range including a frequency of 0 Hz.

FIG. 5 illustrates an example of the frequency spectrum data in the case of no failure sign. Because of no failure sign, the spectrum intensity indicated by the frequency spectrum data is within the spectrum range at all the frequencies in FIG. 5.

FIG. 6 illustrates an example of the frequency spectrum data in the case of any failure sign. Specifically, FIG. 6 illustrates frequency spectrum data in the case of a decrease in the electrostatic capacity of the filter capacitor FC1. As emphasized by the dashed and single-dotted circle in FIG. 6, a decrease in the electrostatic capacity of the filter capacitor FC1 causes rises in the spectrum intensity indicated by the piece of frequency spectrum data generated from the sensor data based on the value measured by the first voltage sensor V1, in the vicinities of the frequencies equal to multiples of the carrier wave frequency. The vicinities of the frequencies equal to multiples of the carrier wave frequency indicate sufficiently narrow frequency ranges including the respective frequencies equal to multiples of the carrier wave frequency. In the example illustrated in FIG. 6, since the spectrum intensity indicated by the frequency spectrum data exceeds the upper limit of the spectrum range in the vicinity of the frequency equal to a multiple of the carrier wave frequency, the comparator 47 outputs a value of 1.

Figure 7:
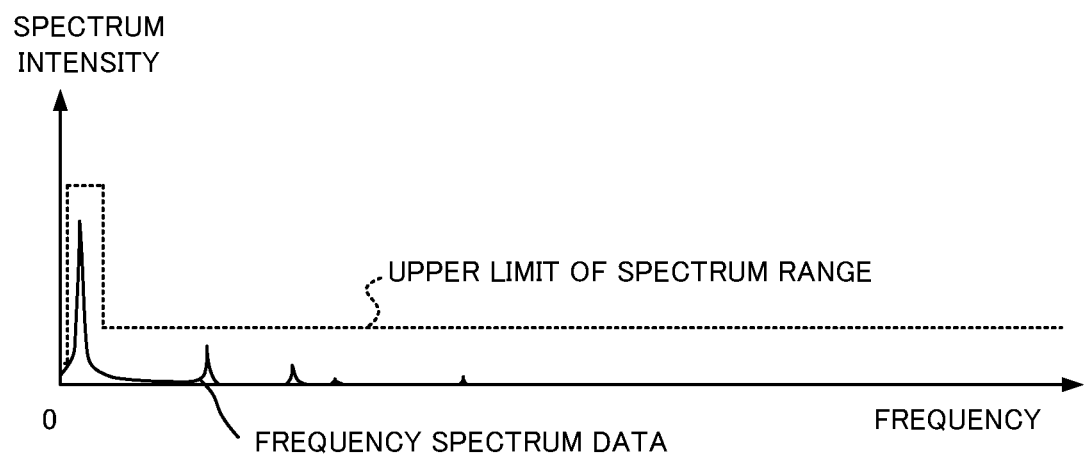
FIG. 7 illustrates another example of frequency spectrum data in the case of no failure sign in the power conversion apparatus according to Embodiment 1.
Figure 8:
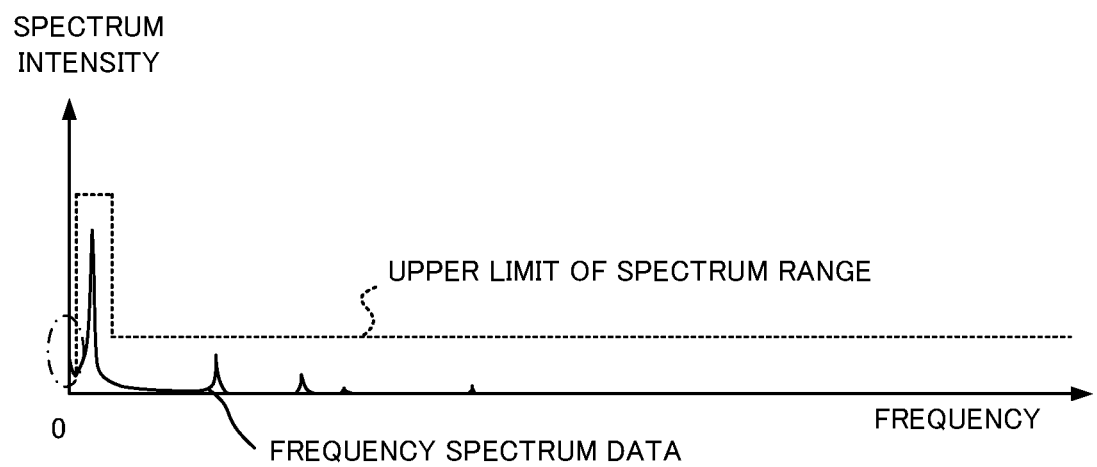
FIG. 8 illustrates another example of frequency spectrum data in the case of any failure sign in the power conversion apparatus according to Embodiment 1.

FIGS. 7 and 8 each illustrate another example of the frequency spectrum data and the spectrum range. In FIGS. 7 and 8, the horizontal axis indicates the frequency, and the vertical axis indicates the spectrum intensity. In FIGS. 7 and 8, the solid line represents a piece of frequency spectrum data generated from the sensor data based on the value measured by the first current sensor A1, and the dotted line represents the upper limit of the spectrum range defined for the first current sensor A1.

FIG. 7 illustrates an example of the frequency spectrum data in the case of no failure sign. Because of no failure sign, the spectrum intensity indicated by the frequency spectrum data is within the spectrum range at all the frequencies in FIG. 7.

FIG. 8 illustrates an example of the frequency spectrum data in the case of any failure sign. Specifically, FIG. 8 illustrates frequency spectrum data in the case of increases in the saturation voltages Vce between the collector and emitter terminals of the IGBTs, which are the switching elements included in the power converter 94. As emphasized by the dashed and single-dotted circle in FIG. 8, increases in the saturation voltages Vce between the collector and emitter terminals of the IGBTs cause an offset voltage of the signal output from the first current sensor A1 and increase the DC component, resulting in a rise in the spectrum intensity at a frequency in the vicinity of 0 Hz. In the example illustrated in FIG. 8, since the spectrum intensity indicated by the frequency spectrum data exceeds the upper limit of the spectrum range at a frequency in the vicinity of 0 Hz, the comparator 47 outputs a value of 1.

The counter 48 illustrated in FIG. 3 accumulates results output from the comparator 47. When the value output from the counter 48, that is, the number counted by the counter 48 exceeds a comparison result threshold, a failure sign can be deemed to exist. The comparison result threshold is arbitrarily defined.

Figure 9:
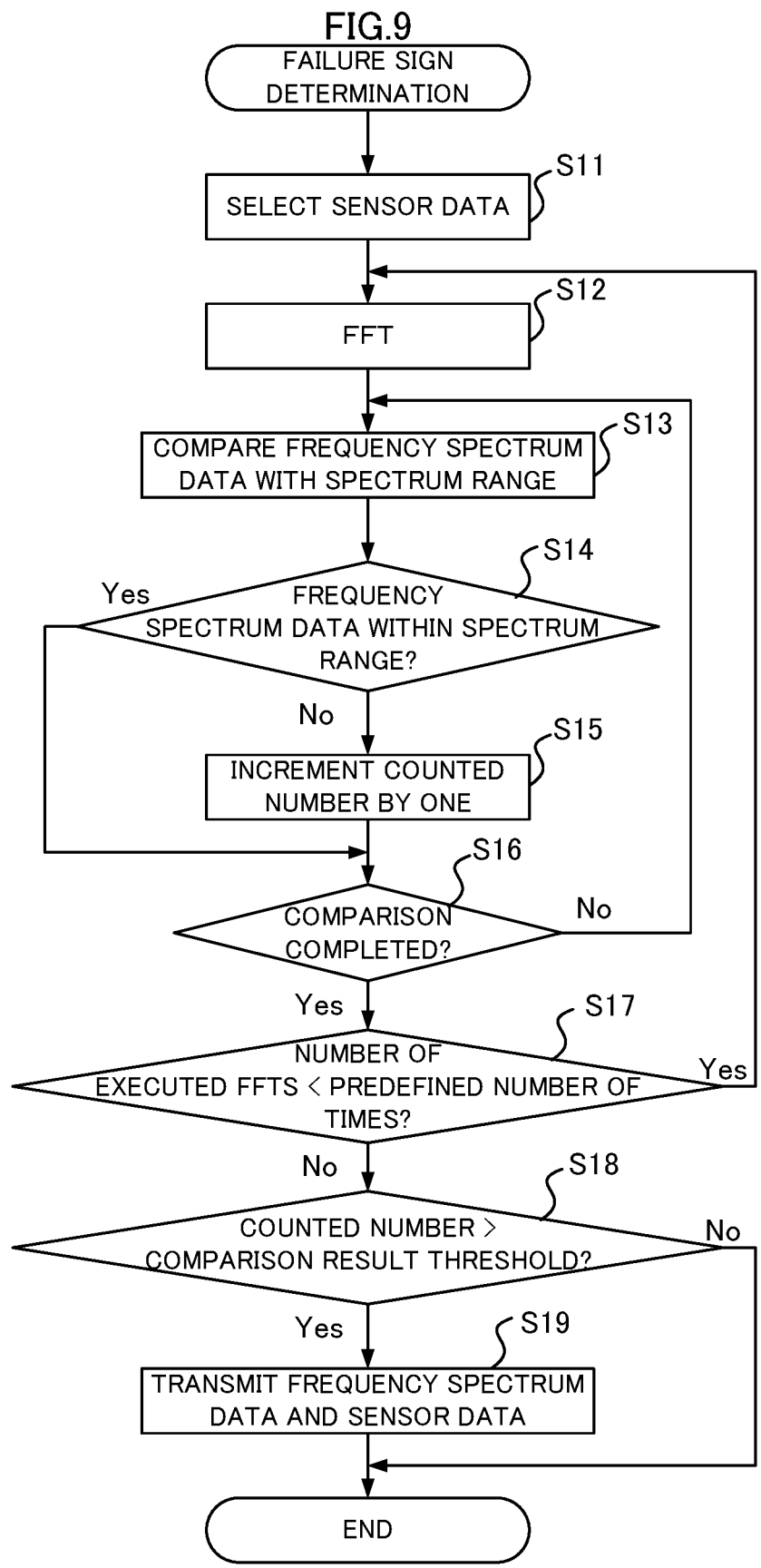
FIG. 9 is a flowchart illustrating exemplary steps of a failure sign determining process executed by the failure sign determining device according to Embodiment 1.

Operations of the failure sign determining device 1 having the above-described configuration are described below with reference to FIG. 9.

The CPU 41 acquires the operating frequency of the power converter 94 and the modulation factor and the carrier wave frequency of the switching control signal from the switching controller 95 via the communication IF 43. When the acquired operating frequency of the power converter 94 and the modulation factor and the carrier wave frequency of the switching control signal accord with the predetermined operating frequency, the predetermined modulation factor, and the predetermined carrier wave frequency, respectively, then the CPU 41 starts the process of determining the existence of a failure sign.

The CPU 41 provides the selector 22 with a selection instruction to select a piece of sensor data based on the value measured by the first voltage sensor V1, for example. The CPU 41 then causes the spectrum range defined for the first voltage sensor V1 to be set in the spectrum range storage 46. The CPU 41 also provides the FFT controller 32 with an initiation instruction.

The selector 22, when receiving the selection instruction from the CPU 41, selects a piece of sensor data based on the value measured by the first voltage sensor V1, from among the pieces of sensor data on the respective sensors that the reception circuit 21 acquires from the AD converter 61 (Step S11). The selector 22 then outputs the selected piece of sensor data to the FFT circuit 31, and causes the selected piece of sensor data to be stored into the sensor data storage 45.

The FFT controller 32, when receiving the initiation instruction from the CPU 41, controls the FFT circuit 31 such that the FFT circuit 31 executes FFT on the piece of sensor data to generate a piece of frequency spectrum data (Step S12). The FFT circuit 31 then outputs the piece of frequency spectrum data to the comparator 47 and causes the frequency spectrum data to be stored into the spectrum data storage 44.

The comparator 47 compares the frequency spectrum data with the spectrum range acquired from the spectrum range storage 46 (Step S13). When the frequency spectrum data is not within the spectrum range (Step S14; No), the comparator 47 outputs a value of 1, and the counter 48 counts once, so that the number counted by the counter 48 is incremented by one (Step S15). In contrast, when the frequency spectrum data is within the spectrum range (Step S14; Yes), the comparator 47 outputs a value of 0, so that the number counted by the counter 48 is not varied. In other words, the process skips Step S15.

When the comparison has not yet been completed for all the frequencies (Step S16; No), the operations from Step S13 to Step S15 are repeated. When the comparison has been completed for all the frequencies (Step S16; Yes) and when the number of executed FFTs is smaller than a predefined number of times (Step S17; Yes), the process returns to Step S12 and repeats the above-described operations. Specifically, the operations involve execution of FFT on the subsequent piece of sensor data based on the value measured by the first voltage sensor V1, and comparison between the resulting frequency spectrum data and the spectrum range.

When the comparison has been completed for all the frequencies (Step S16; Yes) and when the number of executed FFTs is not smaller than the predefined number of times (Step S17; No) and when the number counted by the counter 48 is not larger than the comparison result threshold (Step S18; No), then the process of determining the existence of a failure sign is terminated.

When the comparison has been completed for all the frequencies (Step S16; Yes) and when the number of executed FFTs is not smaller than the predefined number of times (Step S17; No) and when the number counted by the counter 48 is larger than the comparison result threshold (Step S18; Yes), then the CPU 41 transmits the frequency spectrum data stored in the spectrum data storage 44 on the sensor corresponding to the sensor data selected by the selector 22 and the sensor data stored in the sensor data storage 45 on this sensor, to the analysis apparatus 62 via the communication IF 43 (Step S19). After Step S19, the process of determining the existence of a failure sign is terminated.

After completion of the above-described process, the failure sign determining device 1 starts another process of determining the existence of a failure sign using a piece of sensor data based on a value measured by another sensor. For example, the failure sign determining device 1 first determines the existence of a failure sign using a piece of sensor data based on the value measured by the first voltage sensor V1, and then determines the existence of a failure sign using a piece of sensor data based on each of the values measured by the first current sensors A1, A2, and A3. The failure sign determining device 1 then determines the existence of a failure sign using a piece of sensor data based on the value measured by the first voltage sensor V1 again.

As described above, the failure sign determining device 1 according to Embodiment 1 determines the existence of a failure sign in a component of the apparatus using pieces of sensor data based on the values measured by multiple sensors. The determination of the existence of a failure sign using pieces of sensor data based on the values measured by multiple sensors can improve the accuracy of determination of the existence of a failure sign. Furthermore, the failure sign determining device 1 transmits at least either of the frequency spectrum data and the sensor data to the analysis apparatus 62, only when determining that a failure sign exists.

This configuration can suppress an increase in data traffic between the failure sign determining device 1 and the analysis apparatus 62. That is, the failure sign determining device 1 can improve the accuracy of determination of the existence of a failure sign while suppressing an increase in communication loads. In other words, a network in the vehicle does not require bandwidth expansion for communication with the analysis apparatus 62.

Embodiment 2

The spectrum range storage 46 does not necessarily store the upper limits of the spectrum ranges at the respective frequencies as in Embodiment 1, and may store spectrum ranges by any procedure. The failure sign determining device 1 according to Embodiment 2 described below is characterized in that the spectrum range storage 46 stores spectrum ranges by a procedure different from that in Embodiment 1. The configuration and operations of the failure sign determining device 1 according to Embodiment 2 are identical to those in Embodiment 1.

In Embodiment 2, as illustrated in FIG. 10, the spectrum range storage 46 stores addresses each corresponding to the frequency at which the spectrum range varies, and the upper limits of the varied spectrum ranges. The comparator 47 reads the upper limit of the spectrum range from the spectrum range storage 46, and compares the spectrum intensity indicated by the frequency spectrum data generated by the FFT circuit 31 with the upper limit of the spectrum range, as in Embodiment 1. Specifically, from the address 0000h to the address 0013h, the comparator 47 compares the spectrum intensity indicated by the frequency spectrum data with the upper limit Th1 of the spectrum range. From the address 0014h to the address 0043h, the comparator 47 compares the spectrum intensity indicated by the frequency spectrum data with the upper limit Th2 of the spectrum range.

As described above, the failure sign determining device 1 according to Embodiment 2 specifies the spectrum range applied to the determination of the existence of a failure sign in the apparatus, on the basis of the address corresponding to the frequency at which the spectrum range varies and the upper limit of the varied spectrum range, which are stored in the spectrum range storage 46. This configuration can allow a memory having a small storage capacity to serve as the spectrum range storage 46. In the case where a memory having the same storage capacity as that in Embodiment 1 is employed as the spectrum range storage 46, the memory is able to store a larger number of patterns of spectrum ranges.

Embodiment 3

Figure 11:
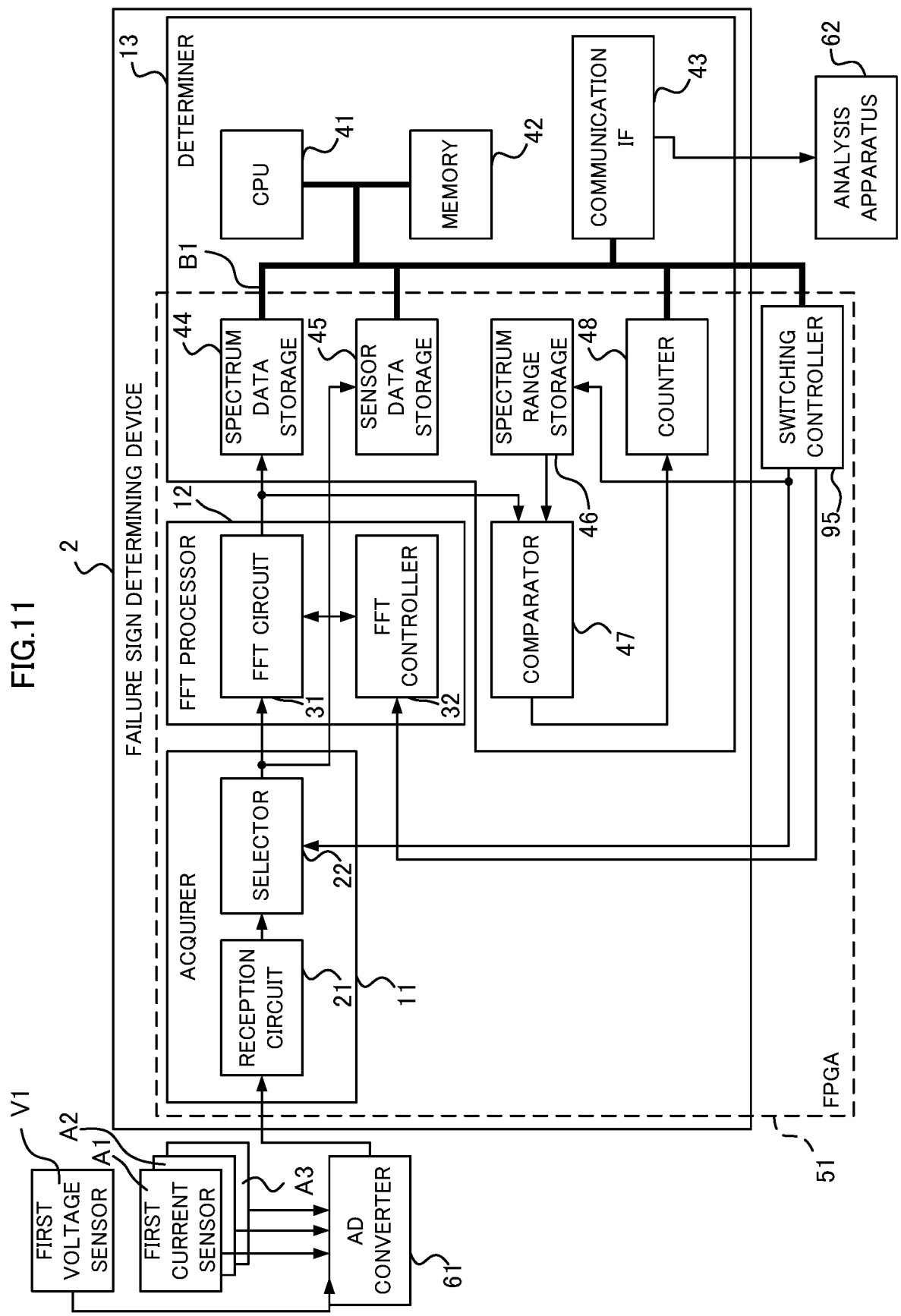
FIG. 11 illustrates an exemplary manner of implementation of a failure sign determining device according to Embodiment 3.

The above-described manner of implementation of the failure sign determining device is a mere example. As illustrated in FIG. 11, the switching controller 95 may also be implemented on the FPGA 51 as well as the acquirer 11, the FFT processor 12, and the part of the determiner 13 included in a failure sign determining device 2. The failure sign determining device 2 is described below focusing on the differences from Embodiment 1.

The switching controller 95 identifies the operation mode in accordance with the operation instruction and the speed of the electric railway vehicle, and executes a PWM control in accordance with the operation mode, as in Embodiment 1. The switching controller 95 acquires the operation instruction and the speed of the electric railway vehicle from the cab and the speed sensor, respectively, via the communication IF 43.

The switching controller 95 then outputs the identified operation mode to the selector 22, the FFT controller 32, and the spectrum range storage 46.

When the operation mode output from the switching controller 95 accords with the predetermined operation mode, the selector 22 selects any of the pieces of sensor data on the respective sensors received by the reception circuit 21, outputs the selected piece of sensor data to the FFT circuit 31, and causes the selected piece of sensor data to be stored into the sensor data storage 45.

When the operation mode output from the switching controller 95 accords with the predetermined operation mode, the FFT controller 32 controls the FFT circuit 31 so as to start the FFT at the FFT circuit 31. The operation at the FFT circuit 31 is identical to that in Embodiment 1.

The spectrum range storage 46 outputs the spectrum range defined in accordance with the operation mode output from the switching controller 95, to the comparator 47. The spectrum range storage 46 retains tables for the respective operation modes. Each of the tables defines the upper limit of the spectrum range at each frequency, as in Embodiment 1. The spectrum range storage 46 also stores the lower limit of the spectrum range at the operating frequency of the power converter 94 for the first current sensor A1, in addition to the above-described upper limit of the spectrum range, as is described in detail below.

The comparator 47 compares the frequency spectrum data with the spectrum range defined for each sensor in accordance with the operation mode. Specifically, the comparator 47 compares the spectrum intensity indicated by the frequency spectrum data with the upper limit of the spectrum range stored in the spectrum range storage 46 at each frequency, as in Embodiment 1. When the spectrum intensity indicated by the frequency spectrum data is higher than the upper limit of the spectrum range, the comparator 47 outputs a value of 1. In contrast, when the spectrum intensity indicated by the frequency spectrum data is equal to or lower than the upper limit of the spectrum range, the comparator 47 outputs a value of 0.

In addition, the comparator 47 in Embodiment 3 determines whether the frequency spectrum data at a specific frequency is within the spectrum range. Specifically, the comparator 47 compares the spectrum intensity indicated by the frequency spectrum data with the lower limit of the spectrum range in the vicinity of the frequency equal to the operating frequency of the power converter 94. The vicinity of the frequency equal to the operating frequency indicates a sufficiently narrow frequency range including the operating frequency. When the spectrum intensity indicated by the frequency spectrum data in the vicinity of the frequency equal to the operating frequency of the power converter 94 is lower than the lower limit of the spectrum range, the comparator 47 outputs a value of 1. In contrast, when the spectrum intensity indicated by the frequency spectrum data in the vicinity of the frequency equal to the operating frequency of the power converter 94 is equal to or higher than the lower limit of the spectrum range, the comparator 47 outputs a value of 0.

Figure 12:
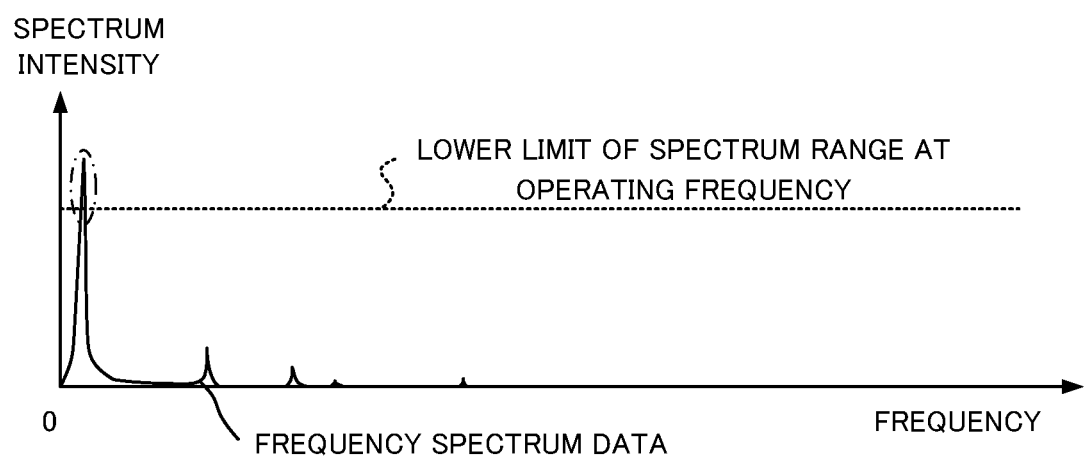
FIG. 12 illustrates an example of frequency spectrum data in the case of no failure sign in a power conversion apparatus according to Embodiment 3.
Figure 13:
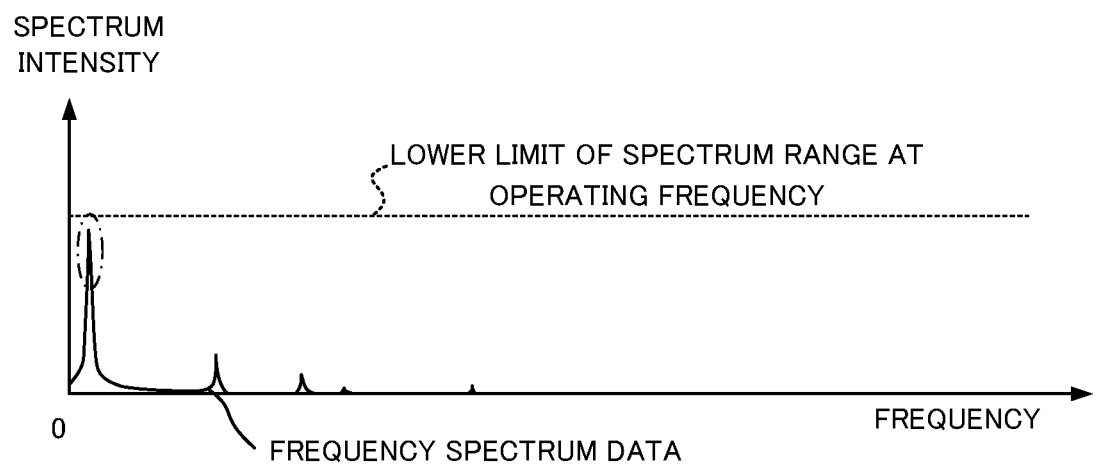
FIG. 13 illustrates an example of frequency spectrum data in the case of any failure sign in the power conversion apparatus according to Embodiment 3.

FIGS. 12 and 13 each illustrate an example of the frequency spectrum data and the spectrum range. In FIGS. 12 and 13, the horizontal axis indicates the frequency, and the vertical axis indicates the spectrum intensity. In FIGS. 12 and 13, the solid line represents a piece of frequency spectrum data generated from the sensor data based on the value measured by the first current sensor A1, and the dotted line represents the lower limit of the spectrum range defined for the first current sensor A1 at the operating frequency of the power converter 94.

FIG. 12 illustrates an example of the frequency spectrum data in the case of no failure sign. Because of no failure sign, as emphasized by the dashed and single-dotted circle in FIG. 12, the spectrum intensity indicated by the frequency spectrum data exceeds the lower limit of the spectrum range in the vicinity of the frequency equal to the operating frequency of the power converter 94.

FIG. 13 illustrates an example of the frequency spectrum data in the case of any failure sign. Specifically, FIG. 13 illustrates the frequency spectrum data in the case of a delay in the switching timing of the switching control signal provided from the switching controller 95 to the IGBTs, which are the switching elements included in the power converter 94. As emphasized by the dashed and single-dotted circle in FIG. 13, a delay in the switching timing of the switching control signal lowers the spectrum intensity indicated by the frequency spectrum data generated from the sensor data based on the value measured by the first current sensor A1, in the vicinity of the frequency equal to the operating frequency of the power converter 94. In the example illustrated in FIG. 13, since the spectrum intensity indicated by the frequency spectrum data is lower than the lower limit of the spectrum range in the vicinity of the frequency equal to the operating frequency of the power converter 94, the comparator 47 outputs a value of 1.

As described above, the components of the failure sign determining device 2 operate on the basis of the identified operation mode acquired from the switching controller 95 implemented on the FPGA 51. This configuration can improve the accuracy of determination of the existence of a failure sign in the apparatus, using pieces of frequency spectrum data generated from the sensor data based on the values measured by multiple sensors and the spectrum ranges for the respective operation modes.

Furthermore, the lower limit of the spectrum range at the operating frequency and the upper limit of the spectrum range are defined for a single sensor, specifically, for the first current sensor A1. This configuration can achieve detection of multiple failure signs from a single piece of sensor data.

Embodiment 4

Figure 14:
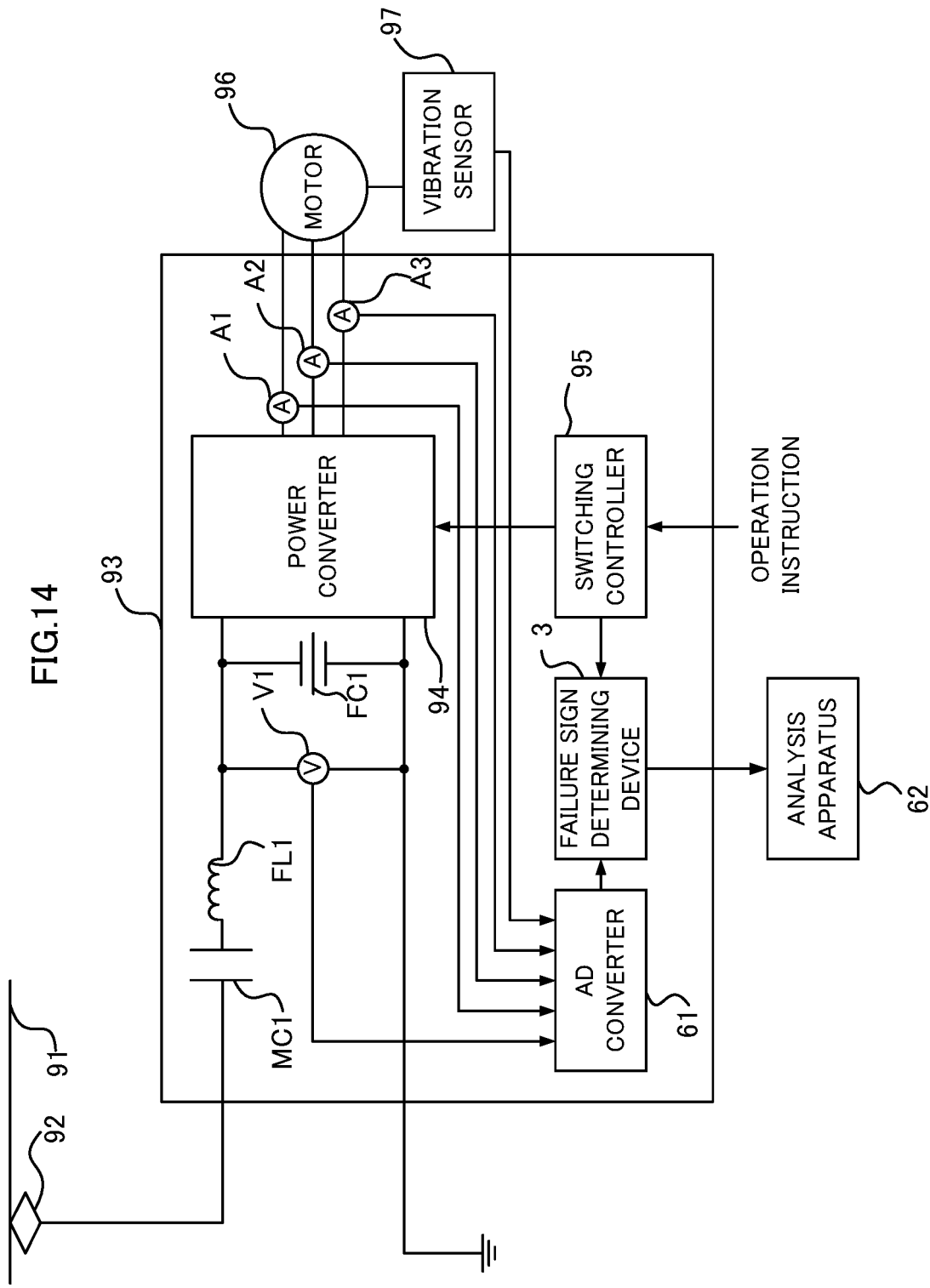
FIG. 14 is a block diagram illustrating a configuration of a power conversion apparatus according to Embodiment 4.

The above-described sensors used in determination of a failure sign are mere examples. The flowing description is directed to a failure sign determining device 3 to determine the existence of a failure sign using a piece of sensor data based on a value measured by a vibration sensor 97 illustrated in FIG. 14 in addition to the pieces of sensor data based on values measured by the first voltage sensor V1 and the first current sensors A1, A2, and A3, focusing on the differences from Embodiment 1.

The failure sign determining device 3 determines the existence of a failure sign in each of the power conversion apparatus 93 and the motor 96. The power conversion apparatus 93 and the motor 96 have configurations identical those in Embodiment 1. The vibration sensor 97 is mounted on the bearing of the motor 96, and measures a value of acceleration of the bearing and then outputs the measured value to the AD converter 61.

The AD converter 61 executes AD conversion of the respective values measured by the first voltage sensor V1, the first current sensors A1, A2, and A3, and the vibration sensor 97 into pieces of digital data, and thereby generates the pieces of sensor data on the respective sensors, and then outputs the pieces of generated sensor data to the failure sign determining device 3.

Figure 15:
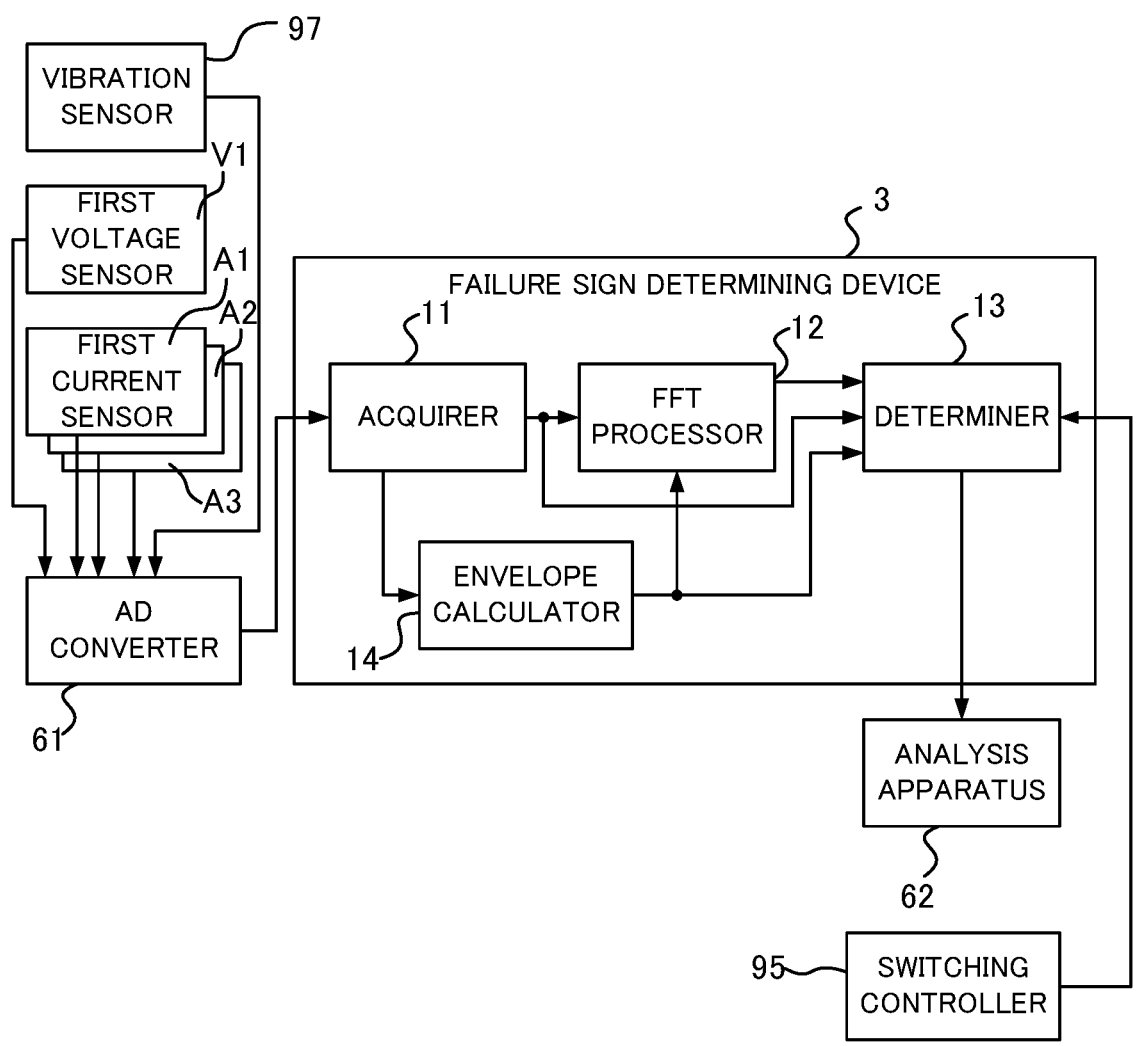
FIG. 15 is a block diagram illustrating a configuration of a failure sign determining device according to Embodiment 4.

As illustrated in FIG. 15, the failure sign determining device 3 further includes an envelope calculator 14 in addition to the components of the failure sign determining device 1 according to Embodiment 1. The failure sign determining device 3 is described in detail below.

The acquirer 11 acquires, from the AD converter 61, pieces of sensor data on the respective sensors, specifically, a piece of sensor data based on the value measured by the first voltage sensor V1, a piece of sensor data based on the value measured by the first current sensor A1, a piece of sensor data based on the value measured by the first current sensor A2, a piece of sensor data based on the value measured by the first current sensor A3, and a piece of sensor data based on the value measured by the vibration sensor 97.

The acquirer 11 then selects any of the acquired pieces of sensor data. When the selected data is the sensor data based on the value measured by the vibration sensor 97, the acquirer 11 outputs the selected data to the envelope calculator 14. In contrast, when the selected data is the sensor data based on the value measured by any of the first voltage sensor V1 and the first current sensors A1, A2, and A3, then the acquirer 11 outputs the selected data to the FFT processor 12 and the determiner 13.

The envelope calculator 14 calculates an envelope from the piece of sensor data output from the acquirer 11 and thereby generates a piece of envelope data indicating the envelope. The envelope calculator 14 then outputs the envelope data to the FFT processor 12 and the determiner 13.

The FFT processor 12 executes FFT on the piece of sensor data acquired from the acquirer 11 or the piece of envelope data acquired from the envelope calculator 14 and thereby generates a piece of frequency spectrum data. The FFT processor 12 then outputs the frequency spectrum data to the determiner 13.

Figure 16:
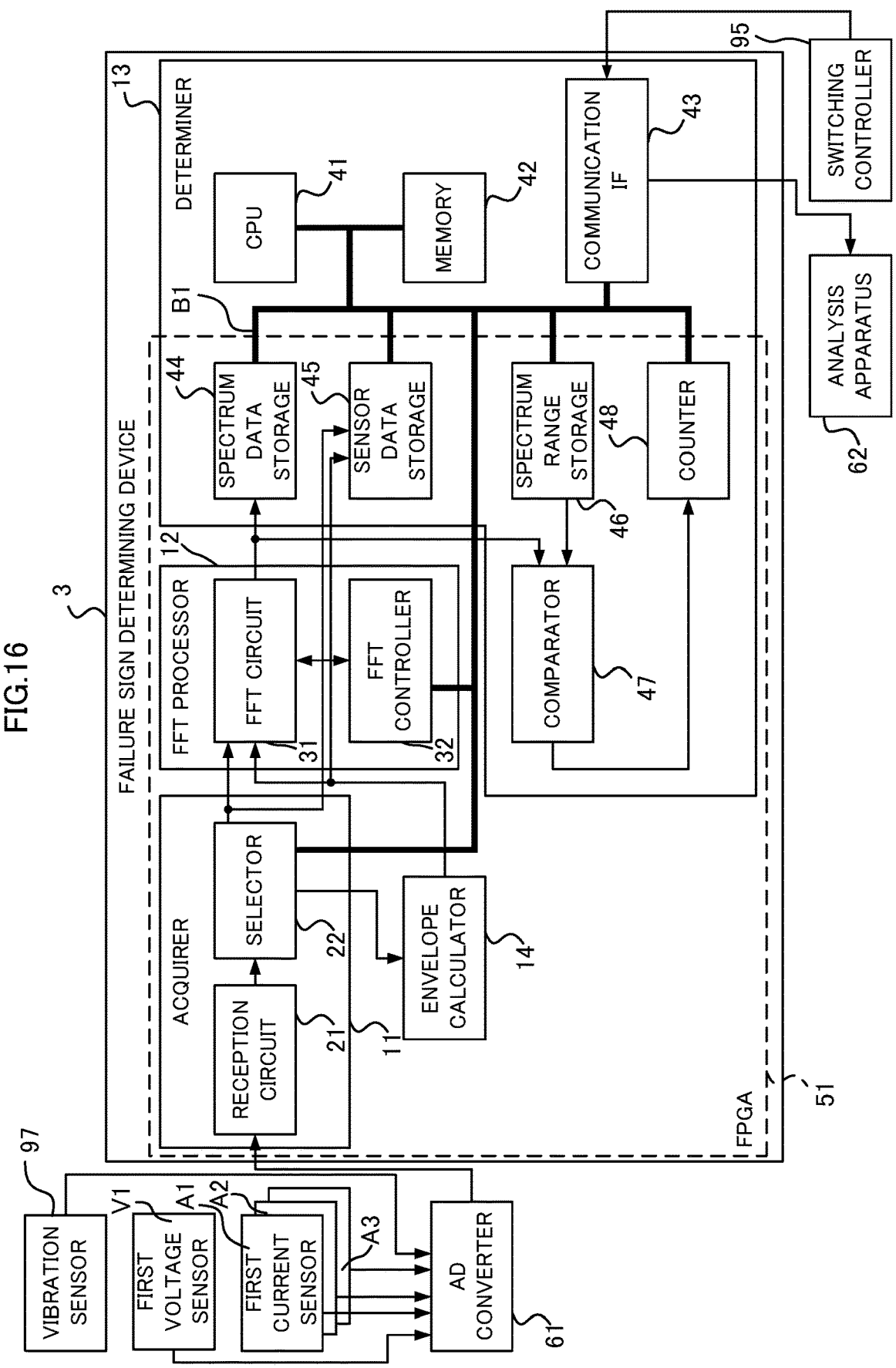
FIG. 16 illustrates an exemplary manner of implementation of the failure sign determining device according to Embodiment 4.

An exemplary manner of implementation of the failure sign determining device 3 is described below with reference to FIG. 16. The failure sign determining device 3 further includes the envelope calculator 14 implemented on the FPGA 51, in addition to the components of the failure sign determining device 1 according to Embodiment 1 illustrated in FIG. 3.

The selector 22 selects one of the multiple pieces of sensor data acquired by the reception circuit 21 in the order of acquisition, for example. When the selected data is sensor data based on the value measured by any of the first voltage sensor V1 and the first current sensors A1, A2, and A3, then the selector 22 outputs the selected data to the FFT circuit 31 and causes the selected data to be stored into the sensor data storage 45. In contrast, when the selected data is the sensor data based on the value measured by the vibration sensor 97, the selector 22 outputs the selected data to the envelope calculator 14.

The envelope calculator 14 calculates an envelope from the piece of sensor data output from the selector 22 and thereby generates a piece of envelope data indicating the envelope. The envelope calculator 14 then outputs the envelope data to the FFT circuit 31 and causes the envelope data to be stored into the sensor data storage 45.

Figure 17:
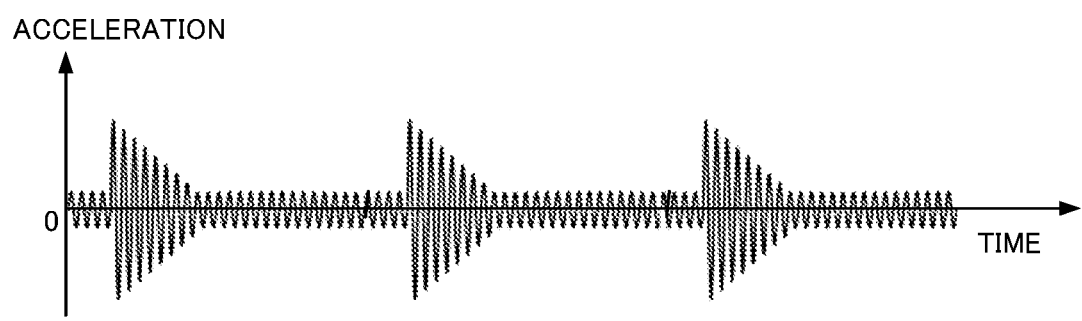
FIG. 17 illustrates an exemplary value measured by a vibration sensor according to Embodiment 4.
Figure 18:
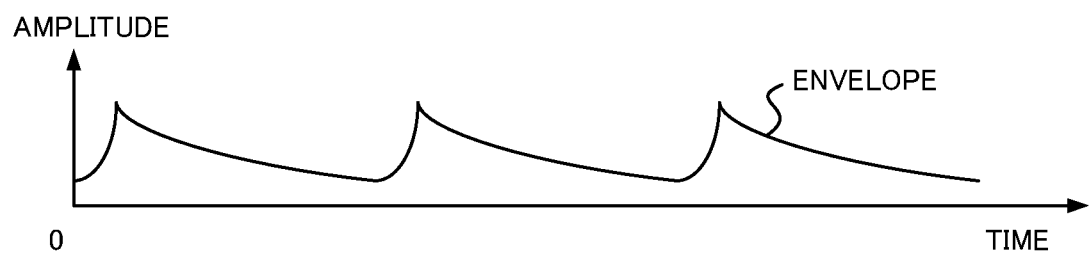
FIG. 18 illustrates an example of envelope data according to Embodiment 4.

FIG. 17 illustrates an example of sensor data acquired by the envelope calculator 14. In FIG. 17, the horizontal axis indicates the time, and the vertical axis indicates the acceleration. FIG. 18 illustrates an example of envelope data generated by the envelope calculator 14. In FIG. 18, the horizontal axis indicates the time, and the vertical axis indicates the amplitude of the envelope. The envelope calculator 14 calculates an envelope of the piece of sensor data illustrated in FIG. 17 and thereby generates a piece of envelope data illustrated in FIG. 18.

Figure 19:
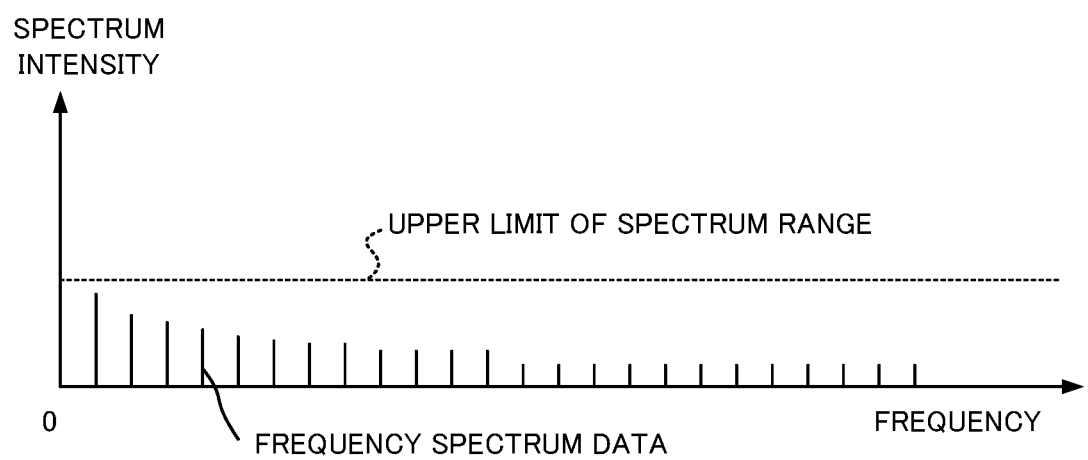
FIG. 19 illustrates an example of frequency spectrum data in the case of no failure sign in the power conversion apparatus according to Embodiment 4.
Figure 20:
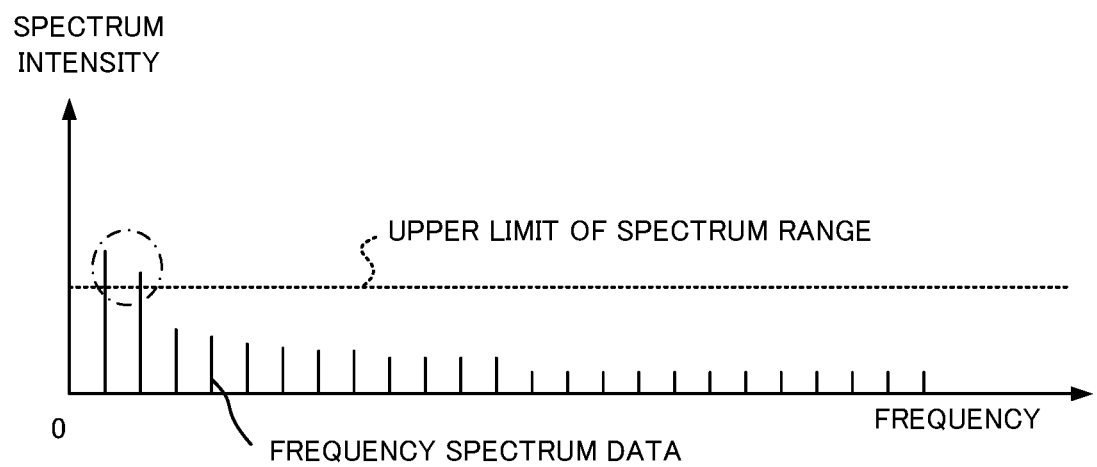
FIG. 20 illustrates an example of frequency spectrum data in the case of any failure sign in the power conversion apparatus according to Embodiment 4.

FIGS. 19 and 20 each illustrate an example of the frequency spectrum data generated from envelope data and the spectrum range. In FIGS. 19 and 20, the horizontal axis indicates the frequency, and the vertical axis indicates the spectrum intensity. In FIGS. 19 and 20, the solid line represents frequency spectrum data generated from the sensor data based on the value measured by the vibration sensor 97, and the dotted line represents the upper limit of the spectrum range defined for the vibration sensor 97.

FIG. 19 illustrates an example of frequency spectrum data in the case of no failure sign. Because of no failure sign, the spectrum intensity indicated by the frequency spectrum data is within the spectrum range at all the frequencies in FIG. 19.

FIG. 20 illustrates an example of frequency spectrum data in the case of any failure sign. Specifically, FIG. 20 illustrates frequency spectrum data when the bearing of the motor 96 has any scratch. As emphasized by the dashed and single-dotted circle in FIG. 20, a scratch on the bearing causes rises in the spectrum intensity indicated by the frequency spectrum data generated from the envelope data in a low frequency region. In the example illustrated in FIG. 20, since the spectrum intensity indicated by the frequency spectrum data exceeds the upper limit of the spectrum range in the low frequency region, the comparator 47 outputs a value of 1.

Figure 21:
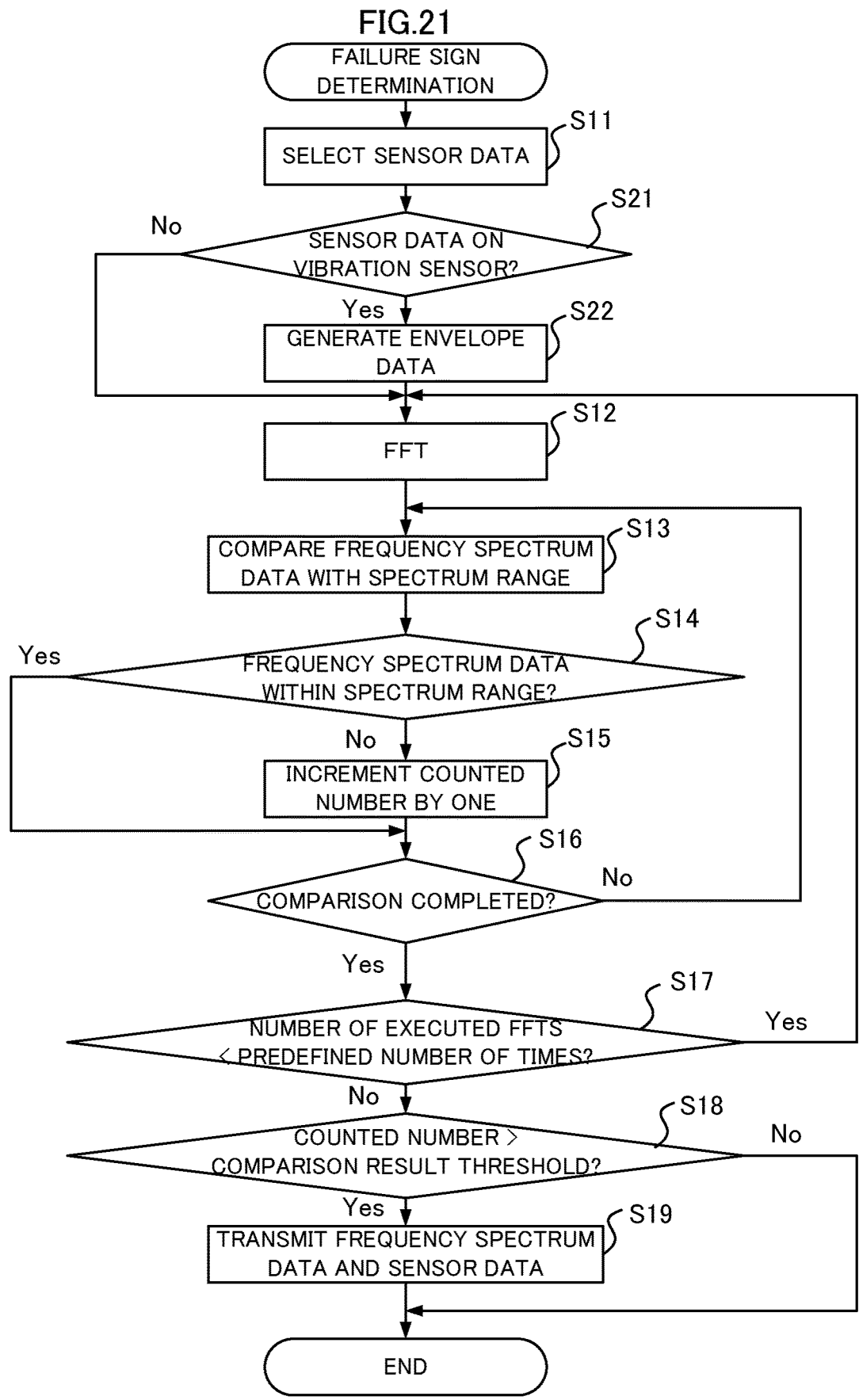
FIG. 21 is a flowchart illustrating exemplary steps of a failure sign determining process executed by the failure sign determining device according to Embodiment 4.

Operations of the failure sign determining device 3 are described below with reference to FIG. 21. The operation in Step S11 is identical to that executed by the failure sign determining device 1 illustrated in FIG. 9.

When the sensor data selected in Step S11 is a piece of sensor data based on the value measured by the vibration sensor 97 (Step S21; Yes), the envelope calculator 14 calculates an envelope from the piece of sensor data and thereby generates a piece of envelope data indicating the envelope (Step S22). In contrast, when the sensor data selected in Step S11 is not the piece of sensor data based on the value measured by the vibration sensor 97 (Step S21; No), the process skips Step S22. The FFT circuit 31 executes FFT on the piece of sensor data selected in Step S11 or the piece of envelope data generated in Step S22 and thereby generates a piece of frequency spectrum data (Step S12).

In detail, when a piece of envelope data is generated in Step S22, the FFT circuit 31 executes FFT on the piece of envelope data and thereby generates a piece of frequency spectrum data in Step S12. In contrast, when the process skips Step S22, the FFT circuit 31 executes FFT on the piece of sensor data selected in Step S11 and thereby generates a piece of frequency spectrum data in Step S12. Step S13 and the following steps are identical to those in Embodiment 1.

As described above, the failure sign determining device 3 according to Embodiment 4 calculates an envelope from a piece of sensor data based on the value measured by the vibration sensor 97, and determines the existence of a failure sign in the apparatus on the basis of a piece of frequency spectrum data generated from the envelope data indicating the envelope. The failure sign determining device 3 can therefore determine the existence of a failure sign in the motor 96.

The above-described embodiments should not be construed as limiting the present disclosure. Some of the embodiments may be arbitrarily combined with each other. The above-described circuit configurations and flowcharts are mere examples and may be arbitrarily modified.

The above-mentioned manners of implementation of the failure sign determining devices 1 to 3 are mere examples. For example, the operations at the CPU 41 may also be performed by the digital signal processor (DSP).

The failure sign determining devices 1 to 3 may determine the existence of a failure sign using a piece of sensor data based on a value measured by a sensor other than the first voltage sensor V1 and the first current sensors A1, A2, and A3. For example, a power conversion apparatus 98 illustrated in FIG. 22 further includes a second voltage sensor V2 and a second current sensor A4, in addition to the first voltage sensor V1 and the first current sensors A1, A2, and A3.

The second voltage sensor V2 measures a voltage of the power source for feeding electric power to the power conversion apparatus 98, in other words, an overhead wire voltage. In detail, one end of the second voltage sensor V2 is connected to the point of connection between the current collector 92 and the contactor MC1, and the other end is grounded. The second voltage sensor V2 thus measures a potential difference between the ground point and the point of connection between the current collector 92 and the contactor MC1.

The second current sensor A4 measures a value of current input to the power converter 94. In detail, the second current sensor A4 is provided to the line connecting the filter reactor FL1 to the power converter 94, and measures a current flowing in the line connecting the filter reactor FL1 to the power converter 94.

Figure 22:
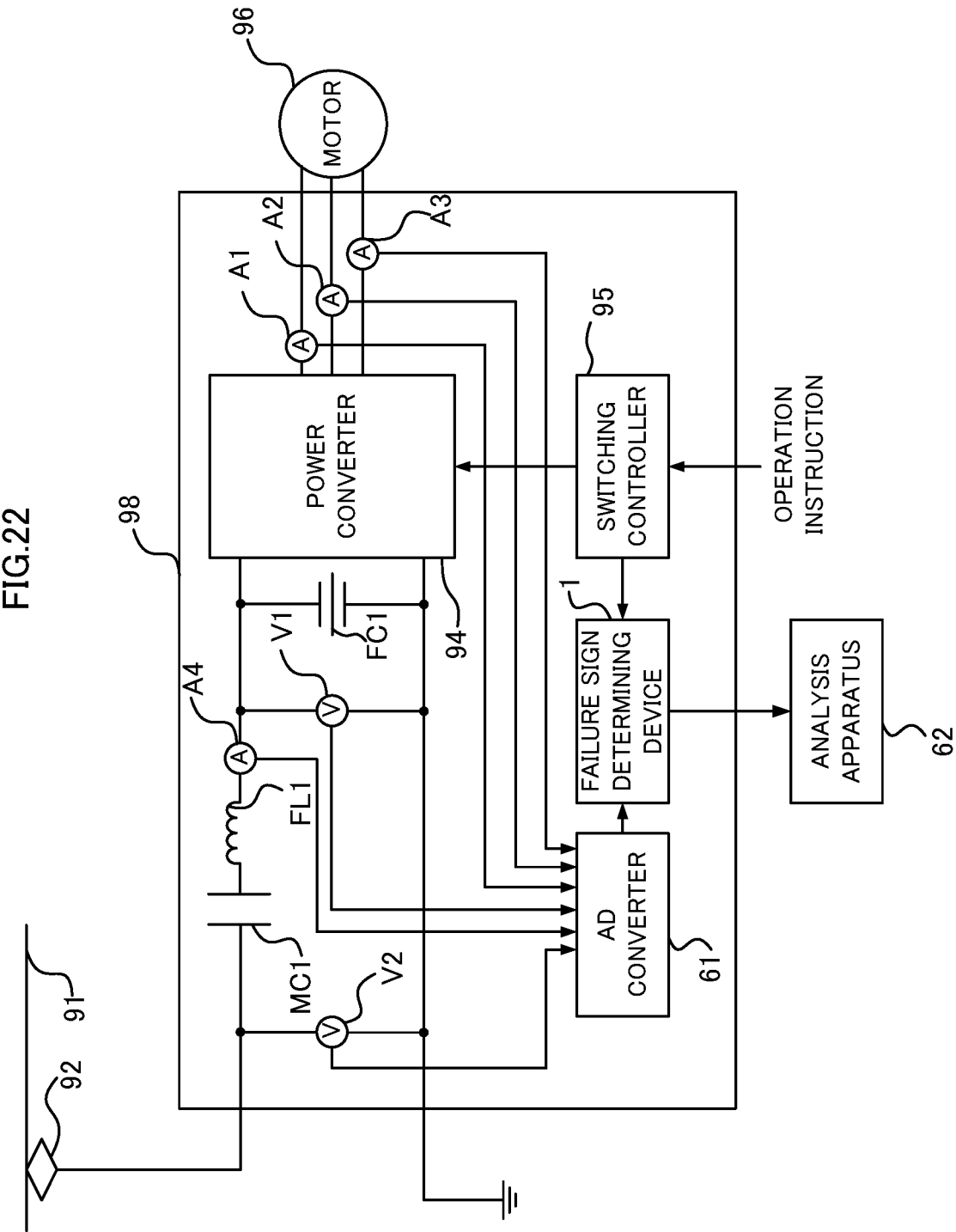
FIG. 22 is a block diagram illustrating a configuration of a modification of the power conversion apparatus according to the embodiments.

The failure sign determining device 1 illustrated in FIG. 22 retains spectrum ranges defined for the respective first voltage sensor V1, the first current sensors A1, A2, and A3, the second voltage sensor V2, and the second current sensor A4. The failure sign determining device 1 compares the frequency spectrum data generated from the sensor data based on the value measured by each sensor with the spectrum range defined for each sensor, and can thereby determine the existence of a failure sign.

The power conversion apparatus does not necessarily include all of the first current sensors A1, A2, and A3 corresponding to the respective phases and may include only two of the first current sensors A1, A2, and A3. In an exemplary case where the first current sensors A1 and A2 are provided to measure values of U-phase current and V-phase current output from the power converter 94, the failure sign determining devices 1 to 3 can calculate a value of W-phase current from the values measured by the first current sensors A1 and A2.

The power conversion apparatuses 93 and 98 may include some sensors selected from among the first voltage sensor V1, the second voltage sensor V2, the first current sensors A1, A2, and A3, the second current sensor A4, and the vibration sensor 97. For example, the power conversion apparatus 93 may include the first voltage sensor V1 and the second voltage sensor V2. In this case, the failure sign determining device 1 retains the respective spectrum ranges defined for the first voltage sensor V1 and the second voltage sensor V2. This failure sign determining device 1 compares the frequency spectrum data generated from the sensor data based on the value measured by each sensor with the spectrum range defined for each sensor, and can thereby determine the existence of a failure sign.

The above-mentioned position of the vibration sensor 97 is a mere example. For example, the vibration sensor 97 may also be mounted on a gear unit that transmits the torque of the motor 96 to the wheels.

The number of the vibration sensor 97 is not necessarily one. For example, the bearing of the motor 96 and the gear unit may be provided with respective vibration sensors 97. In this case, the failure sign determining device 3 generates pieces of envelope data from the pieces of sensor data based on the respective values measured by the vibration sensor 97 mounted on the bearing of the motor 96 and the vibration sensor 97 mounted on the gear unit. This failure sign determining device 3 compares the piece of frequency spectrum data generated from each of the pieces of envelope data with the spectrum range, and can thereby determine the existence of a failure sign.

The failure sign determining devices 1 to 3 may be applied to any apparatus other than the power conversion apparatuses 93 and 98 installed in the electric railway vehicle of a DC feeding system. For example, the failure sign determining devices 1 to 3 may be applied to a power conversion apparatus installed in an electric railway vehicle of an AC feeding system.

The failure sign determining devices 1 to 3 may also be a separate device independent from the power conversion apparatus 93 or 98. Alternatively, the failure sign determining devices 1 to 3 may be implemented as a part of the functions of a system installed in an electric railway vehicle. Specifically, the failure sign determining devices 1 to 3 may be implemented as a part of the functions of a train information management system (TIMS).

The power conversion apparatuses 93 and 98 may be installed in an electric railway vehicle that acquires electric power via third rails, or a diesel vehicle. The power conversion apparatuses 93 and 98 may also be installed in any moving body, such as automobile, aircraft, or marine vessel, other than the electric railway vehicle.

The power conversion apparatus 93 may feed electric power to any load other than the motor 96. For example, the power conversion apparatus 93 may feed electric power to a load, such as lighting equipment or air conditioner. In this case, the load is provided with the vibration sensor 97 or another sensor, so that the failure sign determining devices 1 to 3 can determine the existence of a failure sign in the component of the load.

The above-mentioned power converter 94 is a mere example and may also be a direct current-direct current (DC-DC) converter, for example. In this case, the failure sign determining devices 1 to 3 may determine the existence of a failure sign on the basis of the value measured by a current sensor for measuring a value of DC current output from the power converter 94.

The switching controller 95 may acquire the speed of the electric railway vehicle by a procedure other than the above-mentioned procedure. For example, the switching controller 95 may acquire the speed of the electric railway vehicle from an automatic train control (ATC) device.

The selector 22 may select a piece of sensor data by any procedure. For example, the selector 22 may select a piece of sensor data in accordance with the operation mode.

The CPU 41 may transmit the frequency spectrum data stored in the spectrum data storage 44 on the sensor data corresponding to the sensor data selected by the selector 22 and the sensor data stored in the sensor data storage 45 on this sensor to the analysis apparatus 62 via the communication IF 43, when the number counted by the counter 48 is larger than the comparison result threshold within a predetermined period. This predetermined period may be shortened in response to every detection of the counted number larger than the comparison result threshold.

The CPU 41 may stop the FFT when the number counted by the counter 48 is larger than the comparison result threshold, despite of the number of executed FFTs smaller than the predefined number of times.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Failure sign determining device
11 Acquirer
12 FFT processor
13 Determiner
14 Envelope calculator
21 Reception circuit
22 Selector
31 FFT circuit
32 FFT controller
41 CPU
42 Memory
43 Communication IF
44 Spectrum data storage
45 Sensor data storage
46 Spectrum range storage
47 Comparator
48 Counter
51 FPGA
61 AD converter
62 Analysis apparatus
91 Overhead wire
92 Current collector
93, 98 Power conversion apparatus
94 Power converter
95 Switching controller
96 Motor
97 Vibration sensor
A1, A2, A3 First current sensor
A4 Second current sensor
B1 System bus
FC1 Filter capacitor
FL1 Filter reactor
MC1 Contactor
V1 First voltage sensor
V2 Second voltage sensor

The invention claimed is:

1. A failure sign determining device that determines existence of a failure sign in a component of an apparatus installed in a railway vehicle, the apparatus being a power conversion apparatus that comprises power converting circuitry configured to convert electric power fed from a power source into electric power to be fed to a load and is configured to feed the electric power converted by the power converting circuitry to a motor to generate a force to drive the railway vehicle, the failure sign determining device comprising:
processing circuitry configured:
to acquire pieces of sensor data on a plurality of sensors including a plurality of electrical sensors provided to the apparatus installed in the railway vehicle for measuring mutually different electrical physical quantities of the component, the pieces of sensor data being pieces of digital data based on respective values measured by the plurality of sensors,
to execute fast Fourier transform on each of the acquired pieces of sensor data and generate, for each of the electrical sensors, a piece of frequency spectrum data indicating a spectrum intensity at each frequency,
to determine the existence of a failure sign based on a comparison between the piece of frequency spectrum data and a spectrum range defined for the sensor corresponding to the piece of sensor data used in the generation of the piece of frequency spectrum data, and
to transmit, only when determining that a failure sign exists, at least either of the piece of frequency spectrum data applied to the determination of the existence of a failure sign and the piece of sensor data used in the generation of the piece of frequency spectrum data applied to the determination of the existence of a failure sign, to an analysis apparatus installed in the railway vehicle or outside the railway vehicle,
wherein
the spectrum range is defined for each of the plurality of sensors in accordance with an operating frequency of the power converting circuitry depending on an operation instruction indicating an acceleration or deceleration of the railway vehicle and a speed of the railway vehicle, and a modulation factor and a carrier wave frequency of a switching control signal for controlling switching elements including in the power converting circuitry.

2. The failure sign determining device according to claim 1, wherein the processing circuitry is configured to determine, at each frequency, whether the spectrum intensity indicated by the piece of frequency spectrum data is within the spectrum range.

3. The failure sign determining device according to claim 1, wherein
the processing circuitry is further configured to:
select one of the acquired pieces of sensor data on the respective plurality of sensors, and
execute the fast Fourier transform on the selected piece of sensor data and generate the piece of frequency spectrum data.

4. The failure sign determining device according to claim 1, wherein
the processing circuitry is further configured to acquire the operation mode of the railway vehicle, and
when the acquired operation mode accords with a predetermined operation mode, the processing circuitry determines the existence of a failure sign based on comparison with the spectrum range, the spectrum range being defined, in accordance with the operation mode, for the sensor corresponding to the piece of sensor data used in the generation of the piece of frequency spectrum data.

5. The failure sign determining device according to claim 1, wherein the plurality of sensors include a first voltage sensor to measure a value of voltage input to the power converting circuitry.

6. The failure sign determining device according to claim 1, wherein the plurality of sensors include a first current sensor to measure a value of current output from the power converting circuitry.

7. The failure sign determining device according to claim 1, wherein the plurality of sensors include a second current sensor to measure a value of current input to the power converting circuitry.

8. The failure sign determining device according to claim 1, wherein the plurality of sensors include a second voltage sensor to measure a value of voltage of the power source that feeds the electric power to the power converting circuitry.

9. The failure sign determining device according to claim 1, wherein
the processing circuitry is further configured to retain a value of the spectrum range at each frequency.

10. The failure sign determining device according to claim 1, wherein
the spectrum range varies stepwise depending on a frequency, the processing circuitry is further configured to: retain a value of the frequency at which the spectrum range varies and the varied spectrum range, and specify a spectrum range defined for the sensor corresponding to the piece of sensor data used in the generation of the piece of frequency spectrum data based on the frequency corresponding to the piece of frequency spectrum data and the retained value of the frequency at which the spectrum range varies, and then determine the existence of a failure sign based on comparison between the piece of frequency spectrum data and the specified spectrum range.

11. An in-vehicle apparatus to be installed in a vehicle, the in-vehicle apparatus comprising:

the failure sign determining device according to claim 1, wherein the failure sign determining device determines existence of a failure sign in a component of the in-vehicle apparatus.

12. A method of determining a failure sign, the method comprising:

acquiring pieces of sensor data on a plurality of sensors including a plurality of electrical sensors for measuring mutually different electrical physical quantities, the pieces of sensor data being pieces of digital data based on respective values measured by the respective plurality of sensors provided to an apparatus installed in a railway vehicle, the apparatus being a power conversion apparatus that comprises power concerting circuitry configured to convert electric power fed from a power source into electric power to be fed to a load and is configured to feed the electric power converted by the power converting circuitry to a motor to generate a force to drive the railway vehicle;

executing fast Fourier transform on each of the acquired pieces of sensor data and generating, for each of the electrical sensors, a piece of frequency spectrum data indicating a spectrum intensity at each frequency;

determining existence of a failure sign in a component of an apparatus based on comparison between the piece of frequency spectrum data and a spectrum range defined for the sensor corresponding to the piece of sensor data used in the generation of the piece of frequency spectrum data; and transmitting, in only response to determination of existence of a failure, at least either of the piece of frequency spectrum data applied to the determining of the existence of a failure sign and the piece of sensor data used in the generation of the piece of frequency spectrum data applied to the determination of the existence of a failure sign, to an analysis apparatus installed in the railway vehicle or outside the railway vehicle, wherein the spectrum range is defined for each of the plurality of sensors in accordance with an operating frequency of the power converting circuitry depending on an operation instruction indicating an acceleration or deceleration of the railway vehicle and a speed of the railway vehicle, and a modulation factor and a carrier wave frequency of a switching control signal for controlling switching elements included in the power converting circuitry.

* * * * *